(12) United States Patent
Maier

(10) Patent No.: US 6,694,103 B1
(45) Date of Patent: Feb. 17, 2004

(54) METHOD FOR SWITCHING, AMPLIFICATION AND MODULATION OF UNIDIRECTIONAL DISTRIBUTIVELY COUPLED PULSES AND WAVES

(75) Inventor: Alexandr Alexandrovich Maier, Moscow (RU)

(73) Assignee: Cleomen Ltd., Moscow (RU)

( * ) Notice: Subject to any disclaimer, the term of this patent is extended or adjusted under 35 U.S.C. 154(b) by 0 days.

(21) Appl. No.: 09/508,873

(22) PCT Filed: Sep. 17, 1998

(86) PCT No.: PCT/RU98/00291

§ 371 (c)(1),
(2), (4) Date: Mar. 17, 2000

(87) PCT Pub. No.: WO99/14629

PCT Pub. Date: Mar. 25, 1999

(30) Foreign Application Priority Data

| Sep. 19, 1997 | (RU) | 97116102 |
| Jan. 23, 1998 | (RU) | 98101186 |
| Jun. 10, 1998 | (RU) | 98111314 |

(51) Int. Cl.$^7$ .................. H04B 10/00; H04B 10/12; H04B 10/04; H04B 10/06; G02B 6/42

(52) U.S. Cl. .................. 398/141; 398/139; 398/142; 398/146; 398/178; 398/200; 398/214; 385/5; 385/9; 385/32; 385/50

(58) Field of Search .................. 398/139, 141, 398/142, 146, 178, 200, 214

(56) References Cited

U.S. PATENT DOCUMENTS

| 5,305,136 A | | 4/1994 | Smith .................. 359/247 |
| 5,796,902 A | * | 8/1998 | Bhat et al. .................. 385/122 |
| 5,923,683 A | * | 7/1999 | Morioka et al. .................. 372/6 |
| 5,943,464 A | * | 8/1999 | Khodja .................. 385/122 |

FOREIGN PATENT DOCUMENTS

| RU | 2003150 | 11/1993 | |
| RU | 94025344 | 3/1997 | |
| WO | 96/01441 | 1/1996 | |
| WO | WO96/01441 | 1/1996 | .............. G02F/1/01 |

OTHER PUBLICATIONS

A.A. Maier, "The method of signal switching in tunnelly–coupled optical waveguides", USSR Patent No. 1152397 (Sep. 1982); Byull, Izobret. (46) 300 (1988); A.A. Maier. Physics–Uspekhi vol. 38 (No. 9) pp. 991–1029 (1995). (enclosed).

* cited by examiner

Primary Examiner—Jason Chan
Assistant Examiner—M. R. Sedighian
(74) Attorney, Agent, or Firm—Collard & Roe, P.C.

(57) ABSTRACT

The invention concerns the area of nonlinear fiber and integrated optics, to be exact the area of completely optical switches, modulators and optical transistors, in which solitons are used. The technical problem of the invention is the diminution of pump energy fed into optical waveguide, and also increase of sharpness and depth of switching, and gain of optical transistor, and switching speed as well. One variant of the method consists in that into input of tunnel-coupled waveguides having cubic nonlinearity and the second-order dispersion, they feed radiation as fundamental solitons or pulses close to them in amplitude and in shape with various maximum intensity, which is in limits from $0.6I_M$ up to $1.4I_M$, where $I_M$ is the critical intensity. In other variants of the method additionally into the input of the same or other waveguide they feed radiation, which intensity is much less comparable with the soliton's intensity. In particular, this radiation can be as solitons.

26 Claims, 17 Drawing Sheets

METHOD FOR SWITCHING, AMPLIFICATION AND MODULATION OF UNIDIRECTIONAL DISTRIBUTIVELY COUPLED PULSES AND WAVES

This application is a 371 of PCT/RU98/00291 filed Sep. 17, 1998.

TECHNICAL FIELD

The present invention relates in general to nonlinear integrated and fiber optics and more specifically to completely optical switches and optical transistors and can be used in fiber-optic optical communications, in optical logical schemes and in other fields, where all-optical switching, amplification, controlling and modulation optical radiation is need.

BACKGROUND ART

The method of self-switching of unidirectional distributively coupled waves (UDCW) is known [A. A. Maier, "The method of signal switching in tunnelly-coupled optical waveguides", USSR PATENT No1152397 (September 1982); *Byull. Izobret.* (46) 300 (1988); A. A. Maier. *Physics-Uspekhi* vol.38 (No 9) pp.991–1029 (1995)]. The method consists in a sharp change of a ratio of intensities (and phases) of the waves at output of tunnel-coupled optical waveguides (TCOW) caused by a small variation of intensities or phases of these waves at the input of the TCOW. Due to given method the earlier unknown class of optical transistors was suggested. The important advantage of the fiber optical transistor is convenience of its junction with optical fiber communication lines. The phenomenon of self-switching is accompanied by auto-synchronization of waves, i.e. alignment of phases of waves at the output of TCOW in so-called midpoint of self-switching [(A. A. Maier. *Physics-Uspekhi* v.38 (No 9) 991–1029 (1995)].

As one from perspective variants of the optical transistor the so-called discrete optical transistor was proposed [A. A. Maier. *Sov. J. Quantum Electron.* v.17, p.1013 (1987)], in which as pump the sequence of super-short pulses is used.

If the dispersion is essential in fiber-optic waveguide, that takes place in long fiber-optic waveguides, the optimum shape for supershort pulses is soliton shape.

It is known that, while propagating along the fiber-optic waveguide, even over large distances, the soliton pulses do not diffuse (broaden), saving the form sech(t), since for them the nonlinear compression is compensated by dispersion diffusing. Therefore solitons are perspective for transfer of recordly large information contents.

The fact that solitons can be switched completely as a unit, thus providing complete self-switching, i.e., high effective gain for the discrete optical transistor [A. A. Maier *Sov. J. Quantum Electron.* v.17, p.1013 (1987)], is of even greater importance for us. It is explained by the fact that a soliton propagating along the fiber optic waveguide retains a uniform phase temporal profile, i.e., for all points of the soliton, its phase is nearly the same and depends only on the longitudinal coordinate z. Self-switching occurs near the self-switching midpoint M, corresponding to the unit modulus of the elliptic function, through which the output intensity is expressed. At this point, the output wave amplitudes and phases at the output of the zeroth and the first waveguides are equal, and the characteristic rate of change (i.e., the sensitivity to small variations of input powers and phases) is maximum.

The closest to the proposed method is the method (S. Trillo, S. Wabnitz, E. M. Wright, G. I. Stegeman. *Optics Lett.* 1988, 13, 672–674) of switching of pulses close to the second-order solitons (when input intensities $a_{00}^2$=3.63, $a_{10}^2$=0) in cubic-nonlinear TCOW.

Defects of this method are the rather high energy of solitons fed into the waveguides, and also small sharpness and depth of the switching.

DISCLOSURE OF THE INVENTION

Technical aim of the invention is a decreasing of energy of solitons fed into the waveguides, and also increase of sharpness and depth of switching, and gain of optical transistor.

In the first variant of the method for switching, amplification and modulation of unidirectional distributively coupled pulses and waves they feed radiation in the form of pulses with different maximum intensity $|a_{k0}^2|$ into the input of at least one of tunnel-coupled optical waveguides, having nonlinearity and the second-order dispersion, the put task is solved by that as the pulses they use fundamental solitons or fundamental soliton-like pulses with amplitude and shape near to that of fundamental solitons, maximum intensity $|a_{k0}^2|$ of which lies in the range from $0.6I_M$ to $1.4I_M$, here $I_M$ is critical intensity, thereto $I_M=(2\div8)K/|\theta|$, where $a_{k0}$ is input pulse amplitude in soliton normalization, k is number of waveguide, K is coefficient of tunnel coupling in soliton normalization averaged over the length of tunnel coupling of the waveguides, $\theta$ is arithmetic average nonlinear coefficient of the tunnel-coupled optical waveguides in soliton normalization.

As a rule, $I_M=(5\div7)K/|\theta|$. In particular cases $I_M=(5.5\div6.5)K/|\theta|$, and $I_M=(5.9\div6.1)K/|\theta|$.

As a rule, as the pulses fed into input of waveguide they use fundamental solitons or fundamental soliton-like pulses with amplitude and shape near to that of fundamental solitons, maximum intensity $|a_{k0}^2|$ of which is in the range from $0.9I_M$ to $1.1I_M$. In special cases said maximum intensity $|a_{k0}^2|$ lies in the range from $0.99I_M$ to $1.01I_M$. In particular cases the $|a_{k0}^2|$ is in the range from $0.995I_M$ to $1.005I_M$.

The nearness of pulse amplitude to the amplitude of the fundamental soliton consists in that they use pulses with amplitude $0.5<a_{k0}<1.5$.

In particular the length of tunnel coupling of the waveguides is more or equal to half of the beat length of transfer of radiation power between the waveguides in linear regime. The beat length of transfer of radiation power between the waveguides in linear regime is meant as the length of the tunnel-coupling, at which the transfer of energy from zero waveguide to the first waveguide takes place, provided that radiation is fed only into the zeroth waveguide and nonlinear factor is equal to zero, i.e. for feeding optical radiation, square of intensity of which is by the order of magnitude less than square of the critical intensity. Very sharp switching takes place with the length of tunnel coupling of the waveguides is more than or equals three lengths of transfer of radiation power between the waveguides in linear regime.

In particular case, all said pulses are fed into the input of only one of said tunnel-coupled optical waveguides.

In particular case, the tunnel-coupled optical waveguides are made as dual-core fiber optic waveguides.

In the second variant of the method, consisting in that they feed pump optical radiation in the form of pulses with maximum intensity $|a_{k0}{}^2|$ into the input of at least one of tunnel-coupled optical waveguides, having cubic nonlinearity and dispersion of the second order, the put task is solved by that into the input of another or of the same waveguide they feed radiation with variable intensity and/or maximum intensity and/or phase, thereto maximum intensity $|A_S{}^2|$ of this radiation is at least in ten times less than maximum intensity $|a_{k0}{}^2|$, and as the pulses fed into the input of zero waveguide they use fundamental solitons or fundamental soliton-like pulses with amplitude and shape near to that of fundamental solitons, maximum intensity of which lies in the range from $0.6I_M$ to $1.4I_M$, here $I_M$ is critical intensity, thereto $I_M=(2\div8)K/|\theta|$, where:

$a_{k0}$ is input pulse amplitude in soliton normalization, k is a number of waveguide, K is coefficient of tunnel coupling of the waveguides in soliton normalization averaged over the length of tunnel coupling, θ is arithmetic average nonlinear coefficient of two waveguides in soliton normalization.

As a rule, $I_M=(5\div7)K/|\theta|$. In particular cases $I_M=(5.5\div6.5)K/|\theta|$, and $I_M=(5.9\div6.1)K/|\theta|$.

The nearness of the pulse amplitude to the amplitude of fundamental soliton consists in that they use pulses with input real amplitude $0.5<a_{k0}<1.5$.

As a rule, the maximum intensity $|a_{k0}{}^2|$ is in the range from $0.9I_M$ to $1.1I_M$. In particular cases it is in the range from $0.99I_M$ to $1.01I_M$ and even in the range from $0.995I_M$ to $1.005I_M$.

In different cases, maximum intensity $|A_6{}^2|$ of the radiation with variable parameter is at least in 1000 times less than maximum intensity $|a_{k0}{}^2|$ of the pump pulses, and in at least $10^4$ times less than maximum intensity $|a_{k0}{}^2|$.

As a rule, the length of tunnel coupling is more than or equal to half of the beat length of transfer of radiation power between the waveguides in linear regime. Very sharp switching takes place with the length of tunnel coupling of the waveguides is more than or equals the three lengths of transfer of radiation power between the waveguides in linear regime.

In particular case, all said pump pulses and all signal optical radiation with variable input intensity and/or variable maximum input intensity and/or variable phase are fed into the input of only one of said tunnel-coupled optical waveguides.

In particular, the tunnel-coupled optical waveguides are made as dual-core fiber optic waveguides.

In particular case as the radiation having variable intensity, fed into the input of the first waveguide, they use fundamental solitons or nearby to them pulses.

In the third variant of the method, consisting in that they feed optical radiation in the form of pulses with different and/or variable maximum intensity $|a_{k0}{}^2|$ or with different and/or variable phase into the input of one of tunnel-coupled optical waveguides, having nonlinearity and dispersion of the second order, the put task is solved by that into the input of another or of the same waveguide they additionally feed optical radiation with the different or the same phase or maximum intensity, thereto as the pulses they use fundamental solitons or fundamental soliton-like pulses with amplitude and shape near to that of fundamental solitons, thereto maximum intensity of these pulses is larger than $I_M/4$ or equal to $I_M/4$, where $I_M$ is the critical intensity, thereto $I_M=(2\div8)K/|\theta|$, where:

$a_{k0}$ is input pulse amplitude in soliton normalization, k is a number of waveguide, K is coefficient of tunnel coupling between the waveguides in soliton normalization averaged over the length of the tunnel coupling of the waveguides, θ is arithmetic average nonlinear coefficient of two waveguides in soliton normalization.

As a rule, $I_M=(5\div7)K/|\theta|$. In particular cases $I_M=(5.5\div6.5)K/|\theta|$, and $I_M=(5.9\div6.1)K/|\theta|$.

The nearness of pulse amplitude to the amplitude of fundamental soliton consists in that they use pulses with real input amplitude $0.5<a_{k0}<1.5$ in soliton normalization.

In particular case the length of tunnel coupling is more than or equal to the beat length of transfer of radiation power between the waveguides in linear regime. In particular the length of tunnel coupling is more than or equals two lengths of the energy transfer in linear regime.

In special case all said pulses are fed into the input of only one of the tunnel-coupled optical waveguides.

In the fourth variant, consisting in that they feed optical radiation in the form of pulses having different maximum intensity into input of one of tunnel-coupled waveguides, which have cubic nonlinearity and the second-order dispersion, the put task is solved by that a part of the pulses has maximum intensity $|a_{k0}{}^2|$, so that $|a_{k0}{}^2|^2>13I_M{}^2$, where $I_M$ is the critical intensity, another part of pulses has maximum intensity $|a_{k0}{}^2|$, so that $|a_{k0}{}^2|^2<I_M{}^2/13$, thereto as the pulses they use fundamental solitons or fundamental soliton-like pulses close to them in shape or amplitude, thereto $2K/|\theta|<I_M<8K/|\theta|$, where $a_{00}$ is input amplitude of a pulse in soliton normalization, K is coefficient of the tunnel coupling between the waveguides in soliton normalization averaged over the length of tunnel coupling, θ is arithmetic average nonlinear coefficient of two waveguides in soliton normalization.

As a rule, $I_M=(5\div7)K/|\theta|$. In particular cases $I_M=(5.5\div6.5)K/|\theta|$, and $I_M=(5.9\div6.1)K/|\theta|$.

The nearness of pulse amplitude to the amplitude of fundamental soliton consists in that they use input pulses with real amplitude $0.5<a_{k0}<1.5$, thereto the square of maximum intensity of the pulses is at least by the order of magnitude more than square of the critical intensity.

In particular case the length of tunnel coupling between the waveguides is equal to odd number of transfers of power between the waveguides in linear regime. As a rule the length of tunnel coupling is more or equals the length of transfer of radiation power between the waveguides in linear regime. In special case it is larger than or equal to three lengths of transfer of the optical radiation power between the waveguides in linear regime.

In particular case the tunnel-coupled optical waveguides are made as dual-core fiber optic waveguides.

In special case all said pulses are fed into the input of only one of the tunnel-coupled optical waveguides.

In the fifth variant of the method the put task is solved by that optical radiation with variable parameter is fed into nonlinear optical waveguide having the second-order dispersion, the waveguide is made as birefringent, the fed radiation consists of pump pulses and signal pulses with variable intensity and/or phase, thereto the polarizations of the pump pulses and signal pulses are mutually orthogonal, and polarization of one of radiation is directed along <<fast>> or <<slow>> axis of the optical waveguide, or at the angle to this axis, which does not exceed $\pi/10$, thereto the input power is chosen from the condition $a_{y0}^2 \geq |\alpha|/|\theta|$ or $a_{x0}^2 \geq |\alpha|/|\theta|$, where $a_{y0}$ or $a_{x0}$ is amplitude of pump pulse, $\alpha$ is normalized birefringence of the waveguide, $\theta$ is normalized nonlinear coefficient of the waveguide, thereto as the pulses the fundamental solitons or nearby to them pulses are used.

In particular, to provide high contrast (depth) of the switching the angle between polarization vector of the pump radiation and <<fast>> or <<slow>> axis does not exceed such the angle at which normalized coefficient of linear coupling K=0.05.

In preferable embodiment the waveguide is cubic nonlinear.

In preferable case the nonlinear waveguide is made as fiber optic waveguide.

In another particular case the nonlinear-optical waveguide is made on the basis of semiconductor layered MQW-type structure with alternating layers, containing at least two hetero-transitions, thereto in particular case the semiconductor layered MQW-type structure is made as alternating layers $GaAs/Al_xGa_{1-x}As$, or $In_xGa_{1-x}As/InP$, or $In_{1-x}Ga_xAs_yP_{1-y}/In_{1-x'}Ga_{x'}As_{y'}P_{1-y'}$, where $x \neq x'$ and/or $y \neq y'$, or $CdSe_{1-x}S_x/CdSe$ or $InAs_{1-x}Sb_x/InAs$, or $PbS_xSe_{1-x}/PbSe$, or $Ge_xSi_{1-x}/Si$.

In another particular case the intensity amplitude of signal pulses is at least by two orders of magnitude less than intensity amplitude of pump pulses.

The most gain is reached under normalized birefringence of the waveguide satisfying to inequalities $0.01 \leq \alpha \leq 0.7$, the difference between phases of pump and signal radiation at the input satisfying to inequalities $0 \leq \psi \leq \pi$, and amplitude of pump pulses (at the input) satisfying to inequalities $0.7 \leq a < 1.45$.

In particular case the largest gain is reached when the normalized birefringence of the waveguide is in the range $0.07 \leq \alpha \leq 0.4$, the difference between phases of pump and signal radiation at the input is in the range $\pi/3 - \pi/5 \leq \psi \leq \pi/3 + \pi/5$, and amplitude of pump pulses at the input is in the range $1.05 \leq a \leq 1.3$.

In the sixth variant of the method for switching amplification and modulation of optical radiations consisting in that they feed optical radiation in the form of pulses with different maximum intensity, to the input of one of TCOW (e.g., zero), having nonlinearity and second-order dispersion, the put task is solved by that
the tunnel-coupled optical waveguides have quadratic nonlinearity,
the input normalized complex amplitudes of the pulses correspond to formulas $$A_{jk}(z=0) = \alpha_{jk} \exp(i\phi_{jk}) / \cos h^{\mu}[(t-t_{jk,d})/\tau_{jk,p}],$$

or $A_{jk}(z=0) = \alpha_{jk} \exp(i\phi_{jk})/\exp[-(t-t_{jk,d})^{\mu}/\tau_{jk,p}^{\mu}]$, where $1.5 \leq \mu \leq 2.5$, k=0,1 is number of the optical waveguide, j=1 corresponds to frequency $\omega$, j=2 corresponds to frequency $2\omega$, t is time, $\tau_{jk,p}$ is duration of input pulse at the input of the k-th optical waveguide at frequency $j\omega$, $t_{jk,d}$ is time delay of the pulse at the input of the k-th optical waveguide at frequency $j\omega$, $\phi_{jk}$ is input phase of the pulse with frequency $j\omega$ at the input of the k-th waveguide, $a_{jk}$ is input real amplitude of the pulse, i.e. it is amplitude module of the pulse with frequency $j\omega$ at the input of the k-th waveguide, the pulses are fed at frequencies $\omega$ and $2\omega$ into the input of one of tunnel-coupled optical waveguides, or into inputs of the different tunnel-coupled optical waveguides, the input normalized real amplitudes $a_{jk}$ of the fed pulses are chosen to satisfy to at least one pair of following pairs of inequalities: $a_{10} \geq 2$ and $a_{20} \geq 2$, $a_{11} \geq 2$ and $a_{21} \geq 2$, $a_{11} \geq 2$ and $a_{20} \geq 2$, $a_{21} \geq 2$ and $a_{10} \geq 2$, under this the switching of the pulses from one waveguide to another is done by change of amplitude $a_{10}$ and/or amplitude $a_{11}$, and/or amplitude $a_{20}$, and/or amplitude $a_{21}$, or phase $\phi_{10}$ and/or phase $\phi_{11}$, and/or phase $\phi_{20}$, and/or phase $\phi_{21}$ of fed pulses at the input of at least one of said optical waveguides with at least one of said frequencies.

In the most preferable case $\mu=2$. As a rule, $t_{jk,d} < 3\tau_p$; more typically $t_{jk,d} < \tau_p$; for preferable embodiment $t_{jk,d} << \tau_p$, and they can consider $\tau_{jk,d} = 0$.

As a rule, a difference of $\tau_{jk,p}$ from the average quadratic duration $\tau_p$ of the fed pulses is not more than $\tau_p$. Typically, $\tau_{jk,p} = \tau_p$, i.e. all the input pulses have the same input duration.

In the preferable embodiment said amplitudes $a_{jk}$ are chosen to satisfy to at least one pair of the following pairs of inequalities: $3 \leq a_{10} < 9\sqrt{2}$ and $3 \leq a_{20} \leq 9\sqrt{2}$, $3 \leq a_{11} \leq 9\sqrt{2}$ and $3 \leq a_{21} \leq 9\sqrt{2}$, $3 \leq a_{11} \leq 9\sqrt{2}$ and $3 \leq a_{20} \leq 9\sqrt{2}$, $3 \leq a_{21} \leq 9\sqrt{2}$ and $3 \leq a_{10} \leq 9\sqrt{2}$.

Under this, as a rule, variation of amplitude $a_{jk}$, causing switching of pulses from one waveguide to another, does not exceed 0.2 of maximum from the values $a_{jk}$, or variation of phase $\phi_{jk}$, causing switching of pulses from one waveguide to another, does not exceed $0.2\pi$.

Under this, as a rule, the length of tunnel coupling of the waveguides is more or equal to a half of minimum from the beat lengths at frequencies $\omega$ and $2\omega$ in linear regime.

In particular cases the tunnel-coupled optical waveguides are made in the form dual-core fiber optic waveguide or on the basis of KTP crystal, or on the basis of semiconductor layered quantum-well structure, or on the basis of crystal fiber from ferro-organic materials with large quadratic nonlinearity.

Besides as a rule phase-matching condition is fulfilled.

For effective embodiment of the sixth variant of the method, and also for saving a shape of pulse under the dispersion of the second order as a rule the following inequalities $|\Delta| \leq 10K_1$, $|\alpha_j| \leq 10K_1$, $|(\chi_1-\chi_0)/\chi| \leq 10K_1$, $0.08 \leq |D_{1k}/D_{2k}| \leq 12$ are to be satisfied, where $\Delta=(\Delta_0+\Delta_1)/2$, $\Delta_k=\beta_{2k}-\beta_{1k}$ is the difference between effective refractive indexes at frequencies $2\omega$ and $\omega$ in the k-th waveguide, $\alpha_j=\beta_{j1}-\beta_{j0}$ is difference between effective refractive indexes of waveguides <<1>> and <<0>> at frequency $j\omega$, $K_1$, is coefficient of tunnel coupling at frequency $\omega$, $D_{jk}$ is coefficient of second-order dispersion in the k-th waveguide at frequency $j\omega$, $\chi=(|\chi_0|+|\chi_1|)/2$, $\chi_k$ is quadratic-nonlinear coefficient of k-th waveguide.

In the seventh variant of the method consisting in that they feed optical radiation to the input of nonlinear tunnel-coupled optical waveguides, switching of optical radiation from one of said waveguides to another is accomplished by variation of one of parameter of the radiation, the put task is solved by that
the tunnel-coupled optical waveguides have quadratic nonlinearity,
the fed radiation contains optical waves with frequencies $\omega$ and $2\omega$, which are fed into the input of one optical waveguide or into inputs of different optical waveguides, input normalized amplitudes $\rho_{jk}(z=0)$ of the fed waves are chosen to satisfy to at least one pair of following pairs of inequalities: $\rho_{10}(z=0) \geq 2$ and $\rho_{20}(z=0) \geq 2$, $\rho_{11}(z=0) \geq 2$ and $\rho_{21}(z=0) \geq 2$, $\rho_{11}(z=0) \geq 2$ and $\rho_{20}(z=0) \geq 2$, $\rho_{21}(z=0) \geq 2$ and $\rho_{10}(z=0) \geq 2$, where k=0,1 is a number of the optical waveguide, j=1 corresponds to frequency ω, j=2 corresponds to frequency 2ω, under this the switching is fulfilled by variation of amplitude $\rho_{10}(z=0)$ and/or amplitude $\rho_{11}(z=0)$, and/or amplitude $\rho_{20}(z=0)$, and/or amplitude $\rho_{21}(z=0)$, or phase $\phi_{10}(z=0)$, and/or phased $\phi_{11}(z=0)$, and/or phase $\phi_{20}(z=0)$, and/or phase $\phi_{21}(z=0)$ of fed waves at the input of at least one of said optical waveguides for at least one of said frequencies.

As a rule, said normalized input real amplitudes are chosen to satisfy to at least one pair of the following pairs of inequalities: $3 \leq \rho_{10}(z=0) \leq 9\sqrt{2}$ and $3 \leq \rho_{20}(z=0) \leq 9\sqrt{2}$, $3 \leq \rho_{11}(z=0) \leq 9\sqrt{2}$ and $3 \leq \rho_{21}(z=0) \leq 9\sqrt{2}$, $3 \leq \rho_{11}(z=0) \leq 9\sqrt{2}$ and $3 \leq \rho_{20}(z=0) \leq 9\sqrt{2}$, $3 \leq \rho_{21}(z=0) \leq 9\sqrt{2}$ and $3 \leq \rho_{10}(z=0) \leq 9\sqrt{2}$.

As a rule, the change of said normalized real input amplitude $\rho_{jk}(z=0)$, causing the switching of optical radiation from one waveguide to another does not exceed 0.2 of maximum from values of the input amplitudes $\rho_{jk}(z=0)$, or change of input phase $\phi_{jk}(z=0)$, causing the switching of optical radiation from one waveguide to another does not exceed $0.2\pi$.

Under this a length of tunnel coupling of the waveguides is more than or equal to half of minimal value from the beat lengths at frequencies ω and 2ω in linear regime.

In particular cases the tunnel-coupled optical waveguides are made in the form of dual-core fiber-optic waveguide or on the basis of KTP crystal, or on the basis of semiconductor layered quantum-well structure, or on the basis of crystal fiber from ferro-organic materials with large quadratic nonlinearity.

Besides, as a rule, phase-matching condition is fulfilled.

As a rule, for accomplishment effective switching it is needed $|(\chi_1-\chi_0)/\chi| \leq 10 K_1$, where $K_1$ is coefficient of tunnel coupling at frequency ω, $\chi=(|\chi_0|+|\chi_1|)/2$, $\chi_k$ is a quadratic-nonlinear coefficient of the k-th waveguide.

MODES FOR CARRYING OUT THE INVENTION

Figure 1:
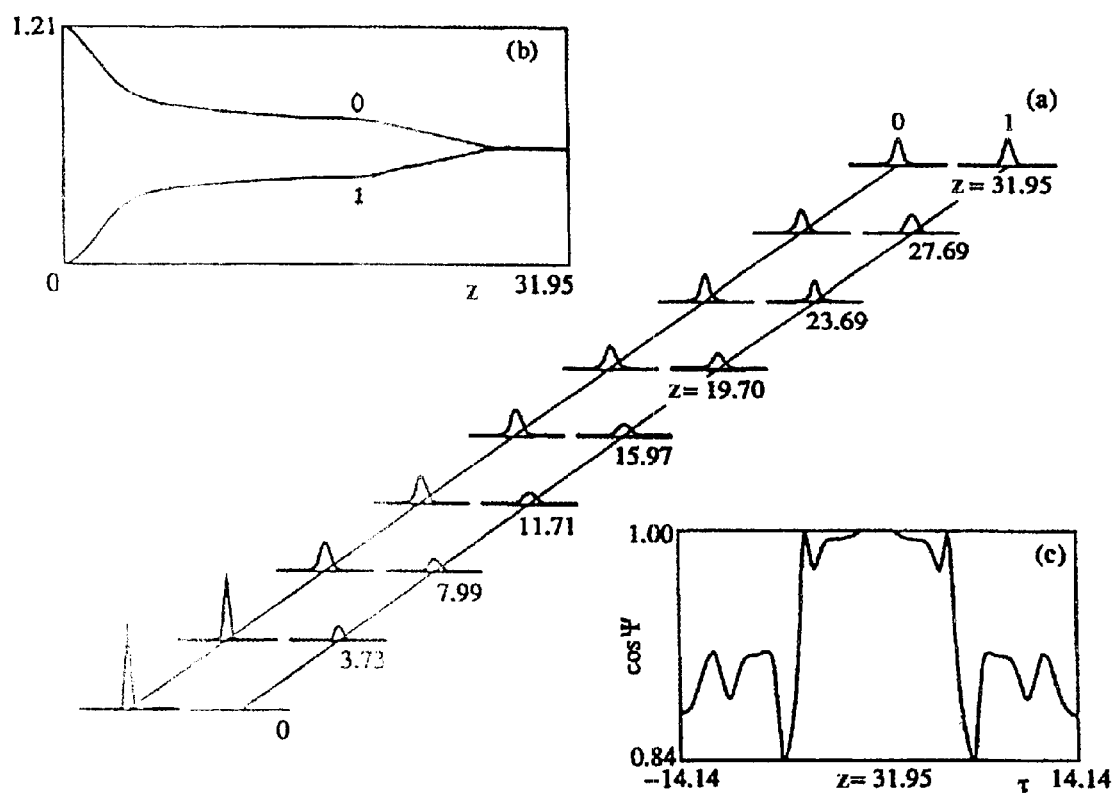
FIG. 1 shows temporal profiles of power $|A_j(\tau)|^2$ for soliton-like pulses in different cross-section of the zero (j=0) and first (j=1) tunnel-coupled optical waveguides (TCOW) (a), dependence of energy of pulses on longitudinal coordinate (b), and $\cos(\phi_1-\phi_0)$ at the output of TCOW (c) for the critical intensity at the input of the zeroth waveguide (the self-switching midpoint M); $a_{00}=1.0998$, K=0.2.

As it is known, the electrical field in nonlinear medium satisfies to the wave equation $$rotrot\vec{E} + \frac{1}{c^2}\frac{\partial^2 \vec{D}}{\partial t^2} = -\frac{4\pi}{c^2}\frac{\partial^2 \vec{P}_{nl}}{\partial t^2} \qquad (1)$$

$\vec{P}_{nl}=\hat{\chi}:\vec{EE}+\hat{\theta}:\vec{EEE}$—nonlinear polarization of medium, $\hat{\chi}$ is tensor of quadratic nonlinearity, $\hat{\theta}$ is tensor of cubic nonlinearity.

About the First, the Second, the Third and the Forth Variants of the Method

In a quasi-stationary mode, when the dispersion of the second order is possible to be neglected, in the simplest case of feeding of radiation into one from identical TCOW (we denote it as zero), the relationship between square of input amplitude $A_{00}$, coupling coefficient K and nonlinear factor θ, appropriate to the midpoint of self-switching M, looks like: $4K=|\theta A_{00}^2|$. The equations describing the nonlinear interaction and self-switching of waves in systems with UDCW, in particular in TCOW, were hereinafter generalized [A. A. Maier. Sov. J. Quantum Electron. v.17, p.1013(1987)] on case of a dispersive medium; the supposition is expressed [A. A. Maier. Sov. J. Quantum Electron. v.17, p.1013 (1987)], that in the case of $\lambda/|\theta A_{00}^2|\approx \tau_p^2/|D|$ in the system coupled solitons can be formed, one of which propagates as zero wave (i.e., in zero waveguide, for the case of TCOW), and the other one propagates as the first wave (in the first waveguide). It was actually confirmed both for area far from the midpoint M, and for the region of the self-switching. The equations ([A. A. Maier. Sov. J. Quantum Electron. v.17, p.1013(1987)]) were numerically solved [Trillo S., et.al. Optics Lett., v.13, p.672(1988)] in soliton normalization.

Electrical field in system of two tunnel-coupled cubic nonlinear optical waveguides can be presented in the form $$\vec{E} = \frac{1}{2}\sum_k \vec{e}_k \tilde{A}_k(z,t) E_k(x,y)\exp(i\omega t + i z_a \beta_k \omega/c) + c.c., \quad (2)$$

where $\beta_k$ is effective refractive index of the k-th waveguide; k=0,1; $E_k(x,y)$ is field profile (i.e., distribution of the field over transverse cross section of the waveguide) in the k-th optical waveguide, $\tilde{A}_k(z,t)$ is slow varying wave complex amplitude in the k-th waveguide, $\vec{e}_k$ is the polarization unit vector of the wave in the k-th optical waveguide.

Substituting (2) into the equation (1), dropping the second derivatives of the amplitudes with respect to z, multiplying both sides by $E_k^*(x,y)$, integrating over the transverse cross section, we obtain the system of reduced equations for the fields amplitudes:

$$i\frac{\partial A_0}{\partial z} + iv\frac{\partial A_0}{\partial \tau} + 0.5\frac{\partial^2 A_0}{\partial \tau^2} = -KA_1\exp(i\alpha z) - \theta_0|A_0|^2 A_0 \quad (3)$$

$$i\frac{\partial A_1}{\partial z} - iv\frac{\partial A_1}{\partial \tau} + 0.5\frac{\partial^2 A_1}{\partial \tau^2} = -KA_0\exp(-i\alpha z) - \theta_1|A_1|^2 A_1,$$

where for soliton normalization $z=z_a/l_d$ is coordinate along the TCOW, normalized by dispersive length $(l_d=|D|/\tau_p^2)$; $\tau=(t-z_a/\mu)/\tau_p$ is normalized wave-frontitraval time; $\tau_p$ is initial duration of fed pulse; K is normalized coefficient of tunnel distributed coupling; $\alpha=\alpha_a 2\pi l_d/\lambda$ estimates difference between phases of waves in TCOW over dispersive length; $\alpha_a=\beta_1-\beta_0$ is the difference in effective indices of the TCOW; $\theta_k$ is normalized nonlinear coefficient (of the k-th waveguide), taking into account field profile; typically $\theta_0=\theta_1=\theta$, for soliton normalization $\theta=1$, $\mu=2\mu_0\mu_1/(\mu_0+\mu_1)$ is mean group velocity of the pulses in the waveguides, $v\approx l_d \tau_p^{-1}(\mu_0^{-1}-\mu_1^{-1})/2$ is the group-velocity mismatch, $A_k = \tilde{A}_k\sqrt{(\tau|\theta|\tau_p^2)/(\lambda\beta D)}$, $\beta=(\beta_0+\beta_1)/2$, $D=(D_0+D_1)/2$, $D_k=\partial^2(\beta_k\omega/c)/\partial\omega^2$.

As a rule, $\alpha=0$, $\upsilon=0$, $\theta=1$. For this case the equations (3) are reduced to the form:

$$i(\partial A_0/\partial z)+0.5(\partial^2 A_0/\partial \tau^2)=-KA_1-|A_0|^2 A_0\; i(\partial A_1/\partial z)+0.5(\partial^2 A_1/\partial \tau^2)=\\-KA_0-|A_1|^2 A_1. \quad (4)$$

Initial conditions looks like:

$$A_0(z=0)=A_{00}(t)=a_{00}\exp(i\phi_{00})/\cos h(t/\tau_p), \quad (5.1)$$

$$A_1(z=0)=A_{10}(t)=a_{10}\exp(i\phi_{10})/\cos h[(t-t_d)/\tau_p], \quad (5.2)$$

where $t_d$ is possible time delay of pulse, arrived into the input of the first waveguide relate to a pulse, fed into the input of zero waveguide. For self-switching of pulses, as a rule, $t_d \leq \tau_p$.

In the infinity field equals zero, so $|A_k(z,\tau\to\pm\infty)|\to 0$.

In given equations there are $A_k$(where k=0, 1), which are normalized amplitudes of electrical fields, squares of which are proportional to energy density, power and intensity and factually are normalized energy density, normalized power and normalized intensity.

Let us consider switching of pulses which are close to fundamental solitons. In the midpoint M of self-switching (i.e. by critical intensity at the input) the phases of output solitons are synchronized automatically.

A coefficient of tunnel coupling is chosen so that amplitude of the fundamental soliton corresponds to the critical intensity. We consider the case $a_{10}=0$. It was found (FIG. 1), that for fundamental soliton with amplitude $a_{00}=1.1$ coefficient of tunnel coupling corresponding to the critical intensity, is K=0.2. Thus, in the ratio $mK/|\theta|=mK/|\theta|=I_M$ between peak (maximum) intensity of soliton, nonlinear factor and factor of tunnel coupling for the midpoint M of self-switching, coefficient of proportionality is m=1.12/0.2= 6(rather than m=4, as for quasi-steady case); that is good accordance to an analytical estimation. In this estimation the soliton mode was considered as temporal analog of a spatial (three-dimensional) optical waveguide and the same approach was applied, as for derivation of the quasi-stationary equations for nonlinear TCOW, supposing, that the spatial wave profile in each waveguide does not depend on z. In outcome of numerical experiments it has been revealed, that the effective switching is reached under coefficients of proportionality which are in the range 2÷8. The most effective switching is reached when m=5÷7, and m=5.5÷6.5.

It should be mentioned the waveguides can have different coefficient of tunnel coupling and the nonlinear coefficients along (over) their length. In this case the computing should use average values of said quantities.

If the changing of temporal profile along waveguides can be neglected, and considering that it saves its shape along all the length of TCOW, then we obtain analytical estimation for coupling coefficient K corresponding to the midpoint M, i.e. for K, corresponding to the critical intensity. Strictly speaking, the position of midpoint of the self-switching for solitons depends on the length of TCOW and under parameters K=0.2, $a_{00}=1.0998$ corresponds to normalized length l=31.95 equals four linear transfers (beats); i.e. L=2Kl=4π. FIG. 1a and 1b shows distinctly that under said parameters the beat of energy between the waveguides is ceased (rather say, a period of energy beat increases infinitely), parity of powers of the waves is set, and cosine of difference in phases between them becomes unity (FIG. 1c). Thus, autosynchronization of soliton-like pulses takes place at the output of the system.

In the first, second and third variants of the method we <<are close>> to the midpoint M of self-switching, e.g., corresponding to K=0.2, $a_{00}=1.0998$, $a_{10}=0$ (FIG. 1). Under this slight increase or decrease of input intensity (by 0,5%) causes self-switching of pulse from one waveguide to another: for $a_{00}=1.097$, the energy left the first waveguide is in 2.2 times larger (FIG. 2a), than that left the zero waveguide; at $a_{00}=1.103$, on the contrary, energy at the output of the first waveguide is in more than four times less than energy at the output of zero waveguide (FIG. 2b). I.e. self-switching of pulses close to fundamental solitons takes place.

Figure 2:
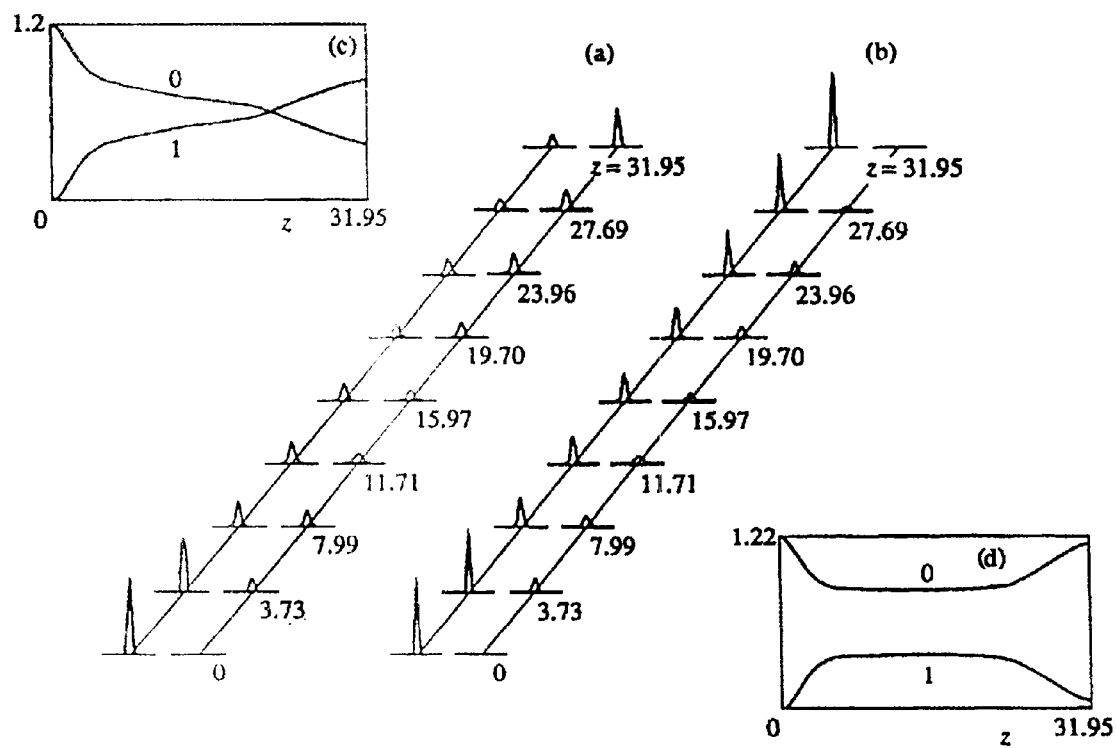
FIG. 2 shows temporal profiles of power of soliton-like pulses in different cross-sections of zero and the first TCOW and at the output of the TCOW (at z=l=31.95) (a and b), and corresponding dependences of the pulses energy on longitudinal coordinate (c and d). K=0.2. The switching is caused by variation in input intensity, then $a_{10}=0$, $a_{00}=1.097$ (a, c), $a_{00}=1.103$ (b, d); or by variation of input signal phase, then $a_{10}=0.007$, $a_{00}=1.0998$, $\Psi_0=\phi_{10}-\phi_{00}=0$ (a, c), $\Psi_0=\pi$ (b, d).

In the second variant of the method the self-switching of pulses occurs by intensity changing of signal pulse fed into the zero or the first waveguide, under simultaneous feeding pump solitons into zero waveguide. Under this, as a rule, power (intensity) of signal radiation at the input is by several orders of magnitude less than power (intensity) of pump solitons FIG. 2,3a,c, 4a,c), however in particular cases said powers may of the same order. The self-switching of pulses occurs by change of small signal pulse, even if power of the signal pulse is by several orders of magnitude less than power of pump solitons (FIG. 2): at $\psi_0=0$ almost all soliton leaves zero waveguide (FIG. 2b), at $\psi_0=\tau$, on the contrary, at the output of the first waveguide energy is in 2.2 times more than energy at the output of the zero waveguide (FIG. 2a). The same switching by changing of phase, but with larger contrast and by smaller power of signal pulse is shown in FIG. 3d,f and FIG. 4d,f.

Signal pulses can have various shape different from soliton shape; signal radiation can also be not in the form of pulses but as continuous waves having variable amplitude and phase. In this case solitons are formed from such radiation under its transmission through the waveguides. In particular, the signal radiation can have sinusoidal dependence on time.

For chosen parameters the same FIG. 2 shows both the switching caused by variation of input soliton intensity (when $a_{10}=0$, and $a_{00}$ is varied), and self-switching caused by variation of signal phase (when $a_{10}=0.007$, $a_{00}=1.0998$, and $\Psi_0$ is varied). The results for these cases are identical.

All these prove the FIG. 1 as well as FIG. 3b, 4b really correspond to midpoint M of the self-switching of solitons.

Figure 3:
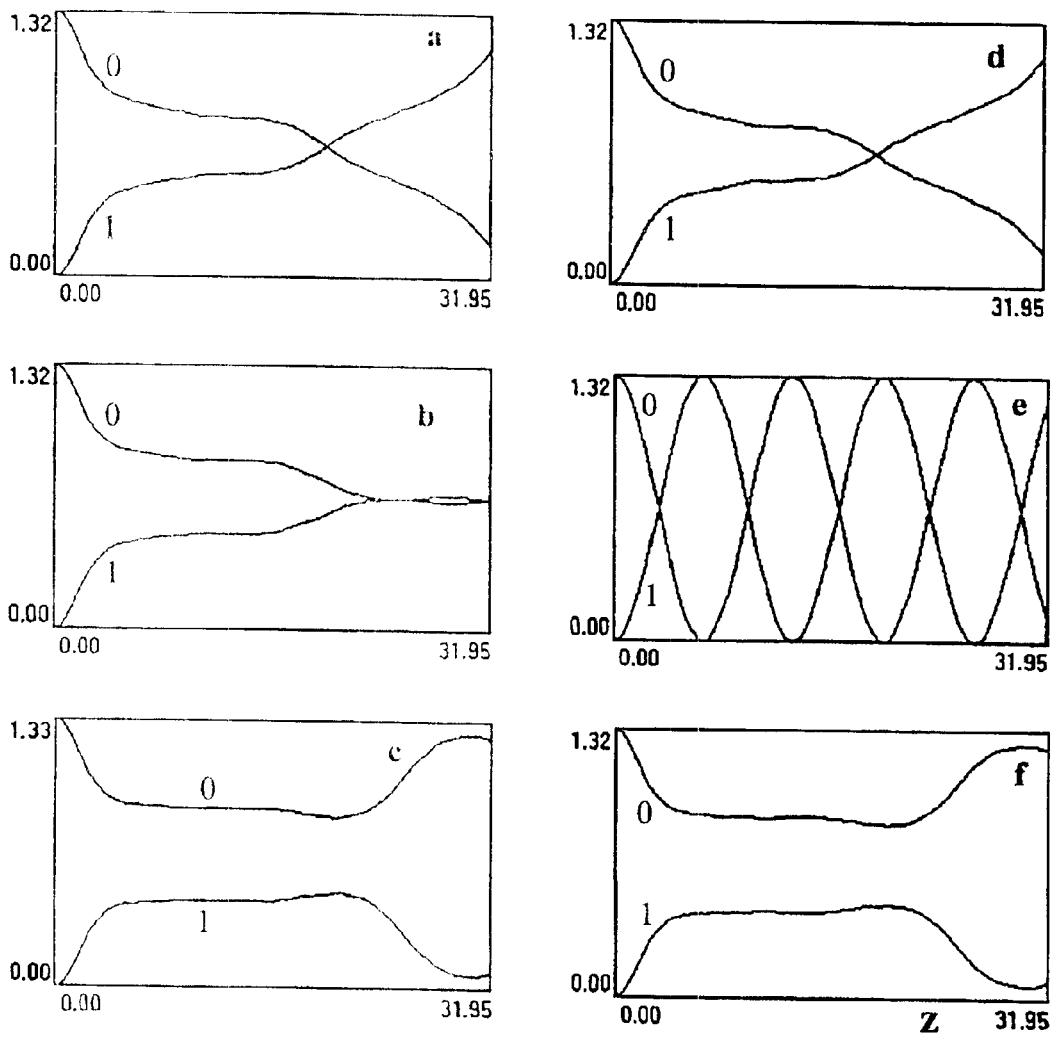
FIG. 3 is dependence of pulse energy on longitudinal coordinate for K=0.236175, l=31.95, and for the amplitudes $a_{00}=1.148$ (a); $a_{00}=1.15$ (b, d, e, and f); $a_{00}=1.152$ (c); $a_{10}=0$ (a, b, c, and e), $a_{10}=0.005$ (d and f); e—linear regime: D=0, θ=0.

Sufficiently large depth (degree, contrast) of switching is reached for slightly larger input amplitudes. E.g., for $a_{00}=1.15$ (FIG. 3) and the same normalized length l=31.95 midpoint M of the self-switching corresponds to coupling coefficient K=0.236175; that is slightly more than analytically estimated value K=0.22. Let K=0.236175, l=31.95, which corresponds to 4,8 linear beats (transfers) (FIG. 3e). Then for $a_{00}=1.148$ approximately 87% of radiation energy emerges from the first waveguide (point $M_1$) (FIG. 3a); however, already for $a_{00}=1.152$ approximately 93.2% of radiation energy emerges from the zero waveguide (point $M_0$) (FIG. 3c). If $a_{00}=1.15$ and $a_{10}=0.005$, then for $\Psi_0=0$ approximately 92.7% of radiation energy emerges from the zeroth waveguide (the point $M_0$) (FIG. 3f), while for $\Psi_0=\tau$, 87% of total radiation energy emerges from the first waveguide (point $M_1$) (FIG. 3d).

Figure 4:
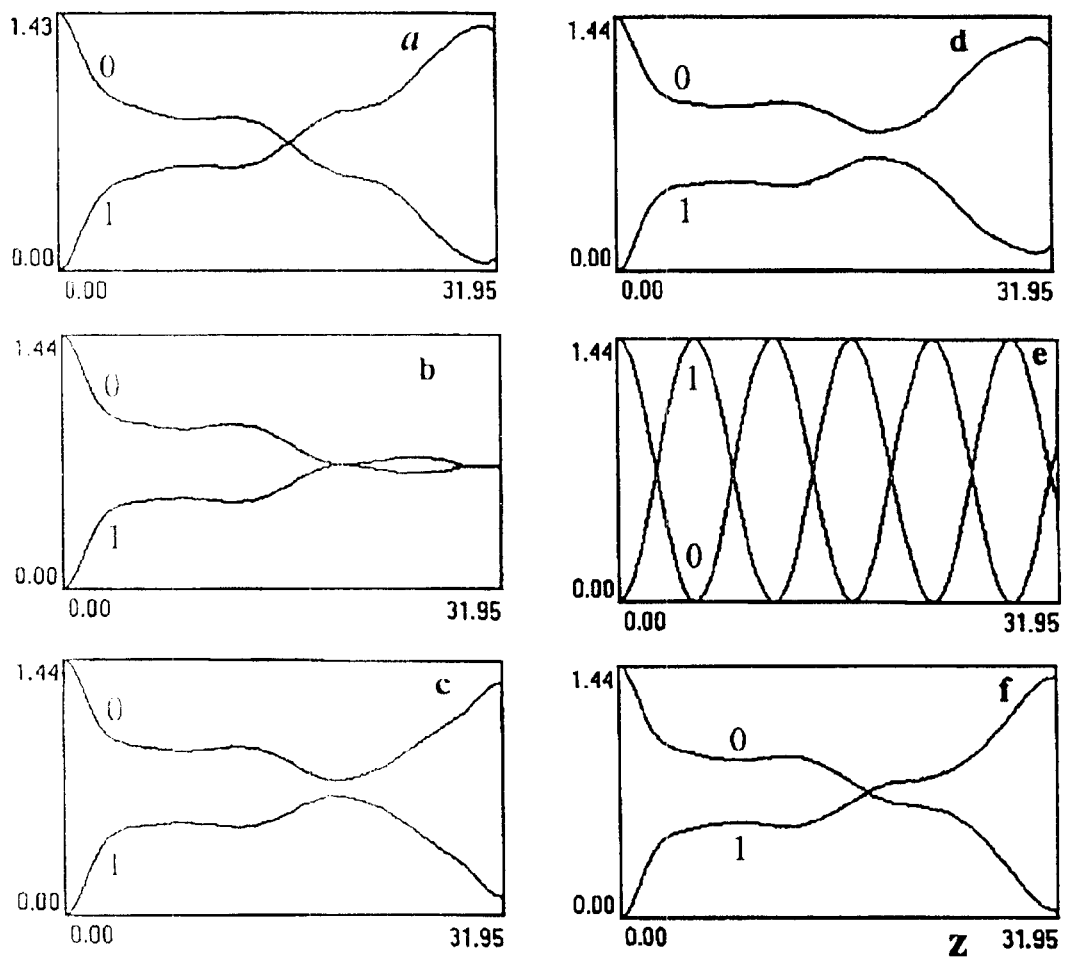
FIG. 4 is dependence of pulse energy on longitudinal coordinate for K=0.274955, l=31.95, and for the amplitudes $a_{00}=1.197$ (a), $a_{00}=1.2$ (b, d, e, f); $a_{00}=1.2004$ (c), $a_{10}=0.0015$ (d, f), $a_{10}=0$ (a, b, c, e); e—linear regime: D=0, θ=0.

Even more deep (contrast) self-switching occurs at $a_{00}=1.2$, when the midpoint M of the self-switching for l=31.95 corresponds to K=0.274955 (FIG. 4). These values correspond to 5.5 linear beats (FIG. 4e). Under this values if $a_{00}=1.2004$, then 91.4% of radiation energy merges from the zero waveguide (point $M_0$) (FIG. 4c), and if $a_{00}=1.197$, then 93.6% of radiation energy emerges from the first waveguide (point $M_1$) (FIG. 4a). If $a_{00}=1.2$, $a_{10}=0.0015$, $\Psi_0=0$, then almost 89% of total energy emerges from zero waveguide (FIG. 4d), and if $a_{00}=1.2$, $a_{10}=0.0015$, $\Psi_0=\tau$, then more than 96% of total radiation energy emerges from the first waveguide (FIG. 4f).

In the third variant of the method, unlike the second one, the signal radiation fed into the input of the zero or the first waveguide, represents fundamental solitons or close to them pulses, thereto intensity of signal radiation equals or close two the intensity of pump solitons fed into the zero waveguide. Under this because of interference occurs in this case, the threshold intensity is defined as ¼ of critical intensity.

If two sequences of solitons are present at the input or sequence of solitons and optical radiation with variable power and/or phase are present at the input, then temporal and phase synchronization are necessary for at least part of the pulses. Concrete conditions of the synchronization depend on the field of application of suggested method; e.g., for logical element <<AND>> the temporal synchronization for at least part of the pulses is important, whereas for logical element <<OR>> it is not of great importance.

In the fourth variant of the method the selection of pulses having different powers due to switching effect takes place. Under this the ratio between maximal intensity of the pulses (solitons) having larger power, maximal intensity of pulses (solitons) having smaller power, nonlinear coefficient of the waveguides and coefficient of tunnel coupling for midpoint M of self-switching is chosen in order to provide transfer of pulses energy from zero waveguide to the first waveguide in linear mode, and transmission of pulse along the zero waveguide almost without transfer of its energy to the first waveguide in nonlinear mode.

Self-switching of solitons according to suggested method is sufficiently steeper than that described in [S. Trillo et.al. *Optics Lett.*, 13, 672(1988)], i.e. is more sensual to small variations of input intensity. E.g., at $1.15 \leq a_{00} \leq 1.2$ the depth (contrast) of the self-switching is in several times more than that in [Trillo S et.al. *Optics Lett.*, 13, 672–674(1988)] (FIG. 3,4). Besides, it arises at smaller input energy of solitons than that in [S. Trillo et.al. *Optics Lett.*, 13, 672–674(1988)], where the pulses closed to the second-order solitons were considered; in present method the pulses are close to fundamental solitons.

In general case the initial conditions (5) may have another form; the pulses (5.2) may have another duration than (5.1), or even another dependence on time.

About the Fifth Variant of the Method

The method is based on phenomenon of self-switching of UDCW having different polarizations in nonlinear medium.

Linear distributive coupling of UDCW can be due to birefringence of the medium, thereto to achieve maximum coefficient of this coupling the vector of electrical field at the input of the medium should be directed at the angle of 45° relative to optical axis of the medium. If input wave is polarized along the optical axis of the medium then linear coupling is absent. Extremely sharp self-switching of the UDCW can be observed when two waves polarized along and orthogonal to optical axis (i.e. along <<fast>> and <<slow>> axis of the waveguide) are fed to the input. Under this the linear distributive coupling between the UDCW is close to zero, but nonlinear coupling between the waves is essential.

In present invention they use the possibility of effective and deep self-switching of solitons and amplification of week pulses (soliton-like) in such regime, and also sharp amplification of small change in power of signal solitons at the input.

Considering nonlinear interaction of two orthogonal polarized pulses in a birefringent nonlinear optical waveguide we can presented full electrical field in the form:

$$\vec{E}=(\tfrac{1}{2})\{\vec{e}_x\tilde{A}_x(z,t)E_x(x,y)\exp(iz_a\beta_x\omega/c)\exp(i\omega t)+ \vec{e}_y\tilde{A}_y(z,t)E_y(x,y)\exp(iz_a\beta_y\omega/c)\exp(i\omega t)\}+c.c., \quad (6)$$

where $\beta_x$ and $\beta_y$ are effective refractive indexes of waves polarized along x and y axes; $E_x(x,y)$ and $E_y(x, y)$ are the field profiles (i.e. distributions of the field over transverse cross section of the waveguide), $\hat{A}_x(z,t)$ and $\hat{A}_y(z,t)$ are slow varying wave (complex) amplitudes, $\vec{e}_x$ and $\vec{e}_y$ are the polarization unit vectors of these waves.

Substituting (6) into equation (1), dropping the second derivatives of the amplitudes with respect to z, multiplying both sides by $E_x^*(x, y)$ and $E_y^*(x, y)$, integrating over the transverse cross section, we obtain the system of reduced equations for the fields amplitudes.

Thus, the nonlinear interaction of orthogonal polarized soliton-like pulses in birefringent nonlinear optical waveguide is described by the equations:

$$i\frac{\partial A_x}{\partial z} + iv\frac{\partial A_x}{\partial \tau} + 0.5\frac{\partial^2 A_x}{\partial \tau^2} = -KA_y\exp(i\alpha z) - \theta_x|A_x|^2 A_x - \quad (7)$$

$$\theta_{xy}|A_y|^2 A_x - \tilde{\theta}A_y^2 A_x^* \exp(2i\alpha z)$$

$$i\frac{\partial A_y}{\partial z} - iv\frac{\partial A_y}{\partial \tau} + 0.5\frac{\partial^2 A_y}{\partial \tau^2} = -KA_x\exp(-i\alpha z) - \theta_y|A_y|^2 A_y -$$

$$\theta_{yx}|A_x|^2 A_y - \tilde{\theta}A_x^2 A_y^*\exp(-2i\alpha z),$$

where for soliton normalization $z=z_a/l_d$ is coordinate along propagation direction of the UDCW, normalized by dispersive length $(l_d=|D|/\tau_p^2)$; $\tau=(t-z_a/\mu)/\tau_p$; $K=2\pi K_a l_d/(\lambda\beta)$ is normalized coefficient of linear distributed coupling, proportional to $\sin(2\eta)$, $\eta$ is the angle between axis y and <<slow>> or <<fast>> axis of the optical waveguide; normalized birefringence $\alpha=2\pi\alpha_a l_d/\lambda$ estimates difference between phases of orthogonal polarized waves over dispersive length, $\alpha \propto \alpha_a \propto \cos(2\eta)$; $\alpha_a=\beta_y-\beta_x$ is the difference in effective indices for the waves with polarizations directed along the x- and y-axes, $\theta_x$, $\theta_y$, $\theta_{xy}$, $\theta$ are nonlinear coefficients; for fiber-optic waveguide typically $\theta_x=\theta_y=\theta$, $\theta_{xy}=\theta_{yx}=2\theta/3$, $\tilde{\theta}=\theta/3$, in soliton normalization $\theta=1$, $\mu=2\mu_x\mu_y/(\mu_x+\mu_y)$ is the mean group velocity of the waves, $v\approx l_d\tau_p^{-1}-\mu_y^{-1})/2$ is the group-velocity mismatch; $z_a$, $K_a$, $\alpha_a$, are absolute values of corresponding quantities, $D=\partial^2(\beta_{x,y}\omega/c)/\partial\omega^2$.

The initial conditions have the following form $$A_x(z=0)=A_{x0}(t)=a_{x0}\exp(i\phi_{x0})/\cos h(\tau) \quad (8.1)$$

$$A_y(z=0)=A_{y0}(t)=a_{y0}\exp(i\phi_{y0})/\cos h(\tau-\tau_d) \quad (8.2)$$

The field vanishes for infinitely large $\tau$: $|A_{x,y}(z, \tau\to\pm\infty)|\to 0$. Here $\tau_{d=td}/\tau_p$ is possible normalized time delay of pulse, arrived into the input of the optical waveguide having <<y>>-polarization relate to pulse having <<x>>-polarization and fed into the input of the same waveguide As a rule, $\tau_d<2$; typically $\tau_d<<1$, so $\tau_d=0$. The equations (7) are written for the soliton normalization; i.e. if $K=v=\theta_{xy}=\theta_{yx}=\theta=0$, then real amplitudes $a_{x0}=1$ or $a_{y0}=1$ correspond to fundamental-soliton propagation along the optical waveguide.

Figure 5:
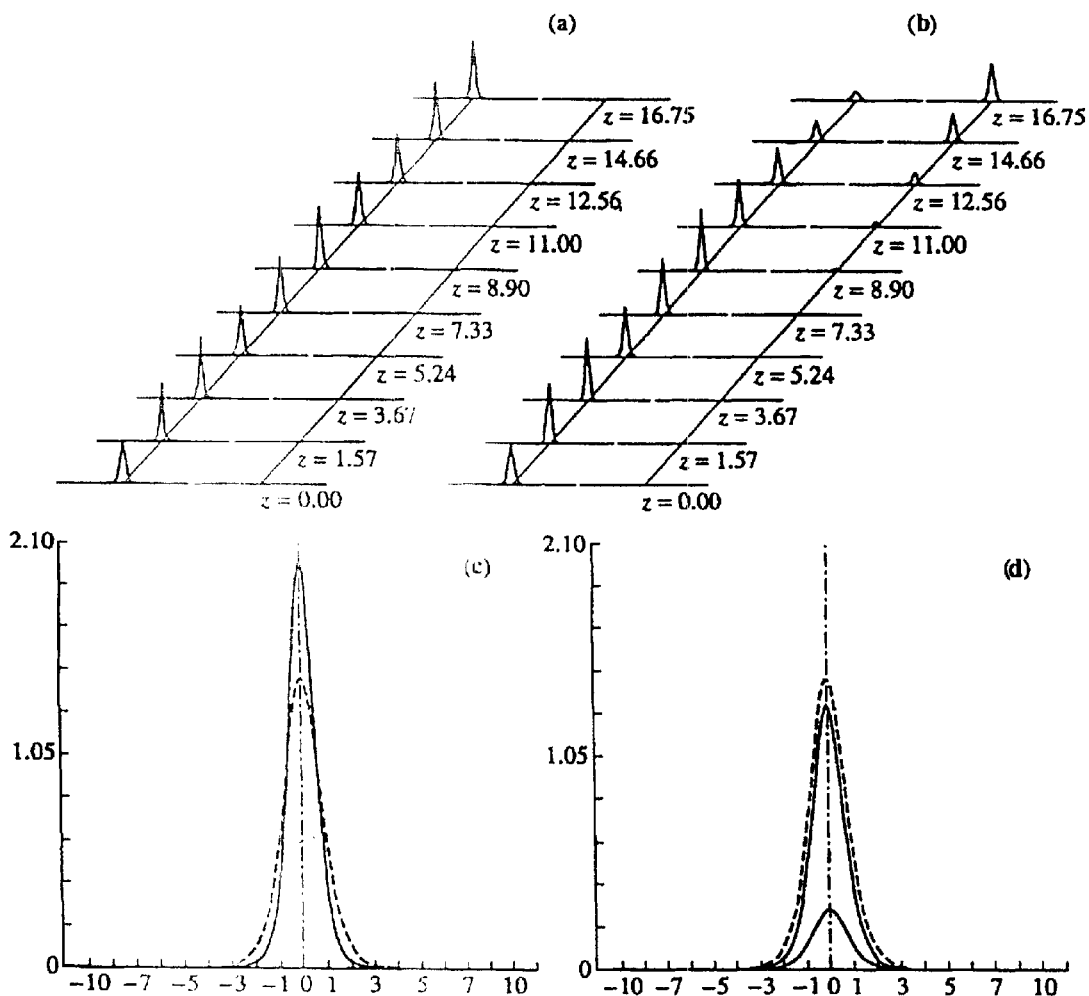
FIG. 5 shows temporal profiles of powers $|A_x(\tau)|^2$ and $|A_y(\tau)|^2$ of two mutually orthogonal polarized soliton-like pulses in birefringent cubic-nonlinear fiber-optic waveguide in cross-sections with different coordinate z (a, b) and at output cross-section (c, d), where dashed (dotted) curve shows input soliton-like pulse with y-polarization $a_{x0}=0$ (a, c), $a_{x0}=0.01$ (b, d); $a_{y0}=1.2$; a=0.15, $\psi_0=\pi/3$; v=0, K=0.
Figure 6:
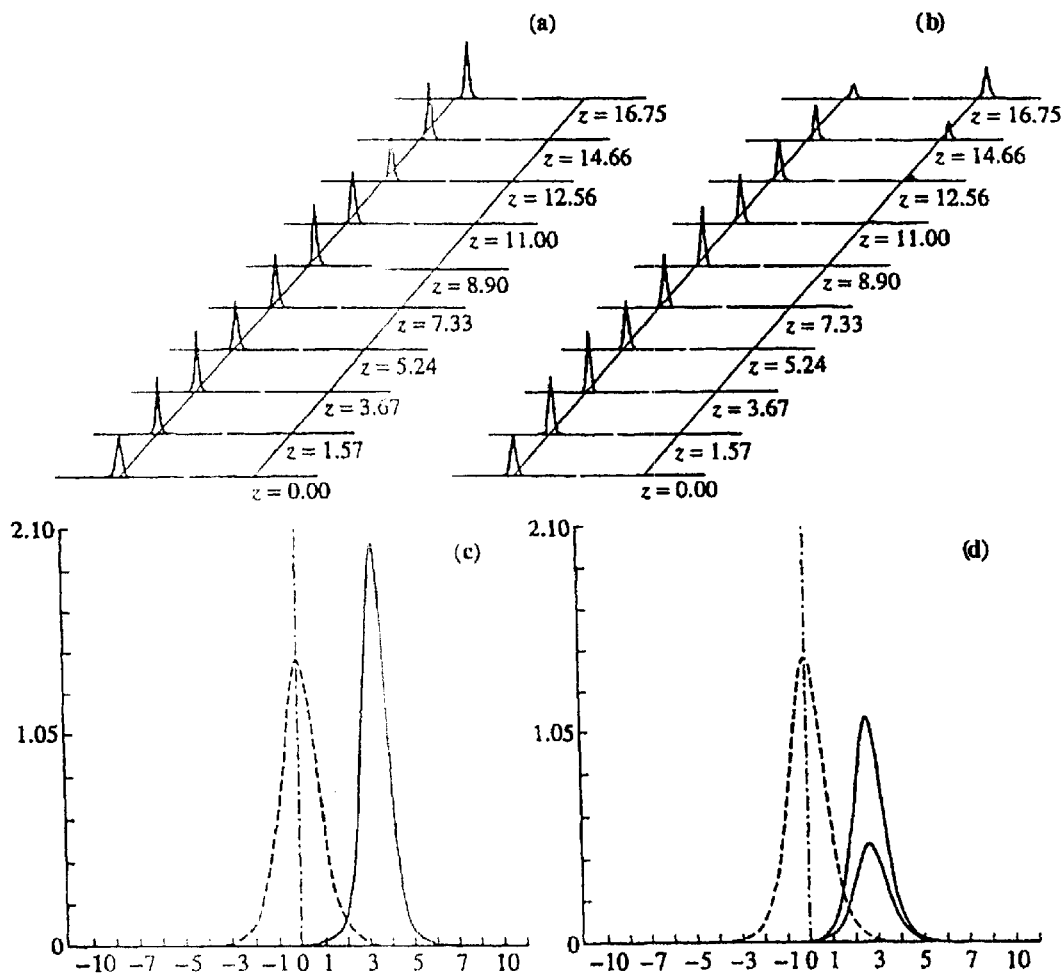
FIG. 6 shows the same as the FIG. 5, except that v=0.2.

In what follows, we consider the self-switching of pulses close in amplitude to fundamental solitons with polarization vectors of interacting solitons directed (in the cross section of the waveguide) along and orthogonal to the optical axis of a birefringent optical waveguide, i.e., along the fast- and slow-propagation axes of this waveguide, or at small angle to at least one of these axes. In this case for self-switching of radiation to be realized the input radiation (pump) intensity corresponding to one of orthogonal polarizations must exceed the threshold intensity $a_{y0}^2 \geq |\alpha|/\theta$ or $a_{x0}^2 \geq |\alpha|/|\theta|$. If the input solitons have only one polarization with polarization vector directed along the optical axis of the optical fiber waveguide, the energy is not transferred to the solitons of other polarization, even when the threshold is exceeded. In other words only the soliton-like pulses of given polarization propagate along the entire length of the optical waveguide and appear at the output of this waveguide. This is the case when $a_{y0}=1.2$ and $a_{x0}=0$ which is illustrated in FIG. 5a. Let us note that this case corresponds to the midpoint M of self-switching. The situation changes radically if small-amplitude signal pulses are fed to the input simultaneously with pump pulses of amplitudes larger than the threshold. The signal pulse power amplitude is by several orders of magnitude smaller than the pump power amplitude (see FIG. 5b); i.e. we have $a_{y0}=1.2$ and $a_{x0}=001$. In this case the input-soliton energy is almost completely transferred to the soliton of orthogonal polarization over a certain length that should correspond to the optical waveguide length (FIG. 5b). FIG. 5a and FIG. 5b shows that switching of a soliton from one polarization to the other (as detected at the output from the waveguide) can be accomplished either by feeding a small-amplitude signal to the optical waveguide input or by cessation of this feeding. The soliton is transferred and switched as a whole. Remarkably, the power of extremely weak input signal pulses (and small differences in their power) are amplified by a factor of about $10^4$ (FIG. 5–6). Thus, the amplification coefficient for signal solitons is much larger here than that attained in nonlinear tunnel-coupled optical waveguides, provided the length is the same in both cases.

Calculations demonstrated that with the input pump soliton-like amplitudes been (specified) in the range $0.7 \leq a \leq 1.45$ the largest gain is achieved under normalized birefringence of the waveguide $0.01 \leq \alpha \leq 0.7$, and for the input phase difference between pump radiation and signal radiation $0 \leq \omega_0 \leq \pi$. In particular optimal parameters are $1.05 \leq a \leq 1.3$, $0,07 \leq \alpha \leq 0,4$, $\pi/3-\pi/5 \leq \omega_0 \leq \pi/3+\pi/5$. Here $\omega_0=\phi_{y0}-\phi_{x0}$.

In an actual situation, the group velocities of solitons with orthogonal polarization vectors are, as a rule, different, i.e. $v\neq 0$. This can result in a <<walk-off>> (dispersal) of solitons with time and in a decrease in the transformation efficiency and in degree (contrast) of switching. However, calculations have demonstrated (see FIG. 6) that the <<walk-off>> of solitons can be avoided. The solitons are prevented from walking off by cross nonlinear interaction, accounted for by the terms involving coefficient $\theta_{xy}=\theta_{yx}$ in the equations (7). Cross nonlinear coupling brings about the mutual self-entrainment of solitons of orthogonal polarizations, keep the solitons together in the time domain, and prevents them from walking off even there is a mismatch in group velocities (FIG. 6) (e.g., when v=0.2). The phenomenon of stabilization of orthogonal-polarized solitons, which prevents (owing to the terms involving $\theta_{xy}$) these solitons from walking off, was ascertained by Menyuk [C. R. Menyuk *Opt. Lett.* 12, No 8, 614–617 (1987)]; however the terms involving $\theta$ and K (and responsible for self-switching of solitons) were not taking into account in [C. R. Menyuk *Opt. Lett.* 12, No 8, 614–617 (1987)]. We demonstrate here that stabilization preventing the solitons from walking off is also observed under conditions of self-switching of these solitons. This is of great importance for the development of devices based on soliton self-switching and on discrete optical transistors [A. A. Maier. *Sov. J. Quantum Electron.* v.17, p.1013 (1987)] involving optical fiber waveguides. Duration of pulse (8.2) may differ from that of (8.1).

Figure 7:
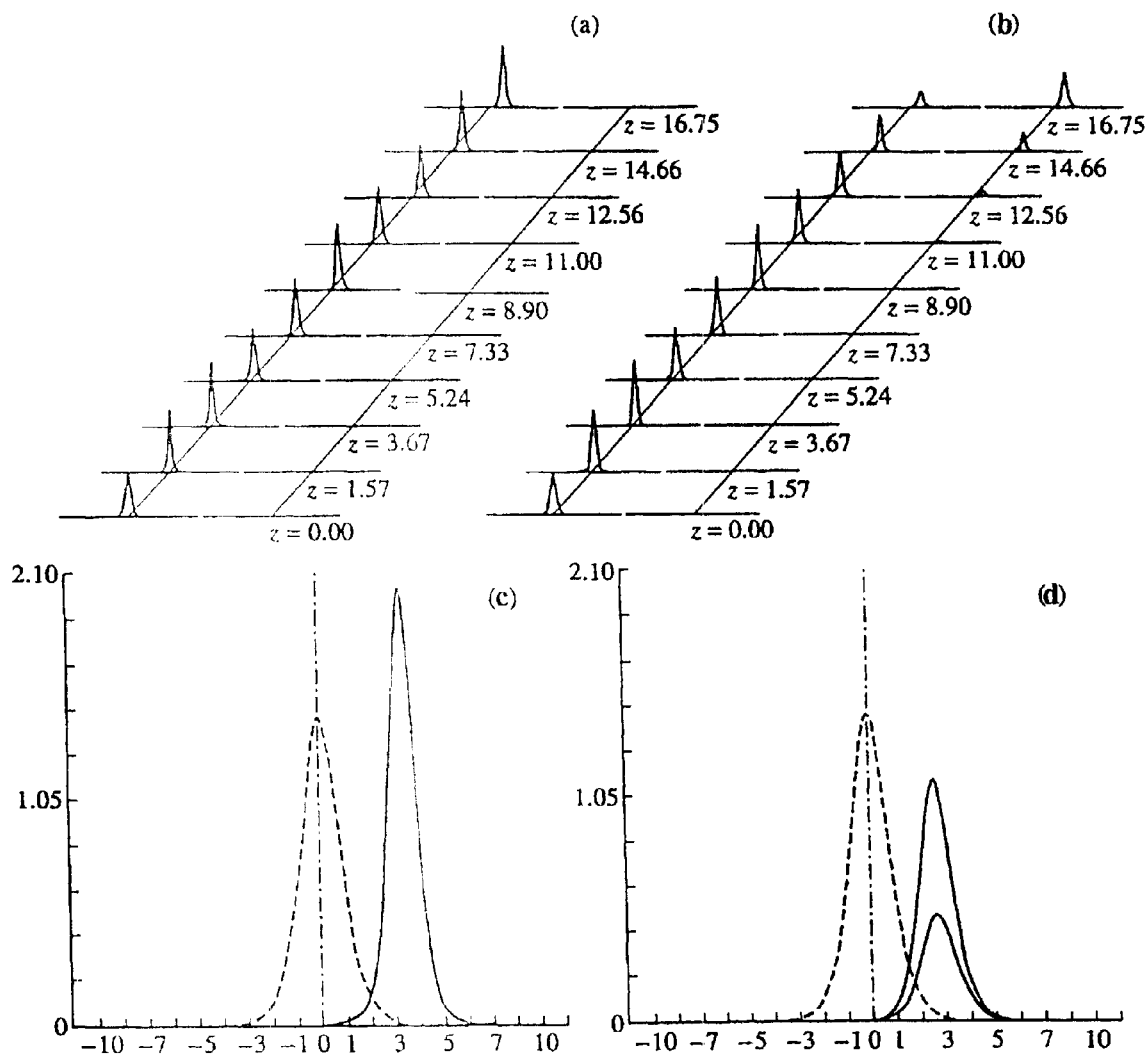
FIG. 7 shows the same as the FIG. 6, except that K=0.0005.

In actual optical waveguide systems, a deviation of the pump-field vector from the optical axis unavoidably brings about a certain (presumably, weak) linear coupling between the soliton-like pulses of orthogonal polarizations. This deviation may be caused by a shortcoming in the technology of fabrication of an anisotropic optical waveguide, en error in orienting the optical waveguide with respect to the vector of the pump field, and so on. Nevertheless, numerical experiments have demonstrated (FIG. 7) that introduction of a small linear-coupling coefficient K≦0.05(e.g., K≈0.0005 for FIG. 7) does not upset the self-switching of solitons, although the contrast (depth) of the self-switching is reduced; this small linear coupling turns out to be a source of spurious signal even when there is no soliton at the input. This spurious signal caused by weak linear coupling brings about nonlinear distributed coupling (as described by the term involving θ). As the spurious signal propagates through the optical waveguide, it becomes markedly amplified owing now to the nonlinear distributed coupling. As a result, background radiation appears at the output, which reduces the contrast of the switching (FIG. 7) Thus, even with weak linear coupling, the contrast (depth) of soliton switching is reduced and noise level is raised. Therefore, linear coupling between orthogonal-polarized solitons should be eliminated wherever possible, at least up to values K≦0.05.

About the Sixth and the Seventh Variants of the Method

The feasibility of existence of spatial solitons in a medium with quadratic nonlinearity for $K_1=K_2=0$ was substantiated as far back as 20 years ago [Yu.N. Karamzin, A. P. Sukhorukov. Pis'ma Zh. Teor. Eksp. Fiz. 13 734(1974)].

We have demonstrated self-switching for soliton-like pulses in quadratically nonlinear TCOW; this switching transfers the pulses from one waveguide to another, owing to a small variation in the amplitude or phase of one of the solitons. It should be emphasized that this switching is fairly profound and features a high gain. The pulses retain their solitonic shape and are switched completely as a whole, although the tunneling-coupled optical waveguide possesses merely a quadratic, rather than a cubic, nonlinearity. In particular cases the TCOW can have also cubic nonlinearity.

Electrical field in system of two tunnel-coupled quadratically nonlinear optical waveguides can be presented in the form $$\vec{E} = \frac{1}{2}\sum_{j,k} \vec{e}_{jk} \tilde{A}_{jk}(z,t) E_{jk}(x,y) \exp(ji\omega t + jiz_a\beta_{jk}\omega/c) + c.c., \quad (9)$$

where $\beta_{jk}$ is effective refractive index of the k-th waveguide for frequency jω; k=0,1; j=1,2; $E_{jk}$ (x, y) is field profile (i.e. distribution of the field over transverse cross section of the waveguide) in the k-th optical waveguide for frequency jω, $\tilde{A}_{jk}$ (z, t) are slow varying (complex) wave amplitudes, $\vec{e}_{jk}$, are the polarization unit vectors of these waves.

Substituting (9) into equation (1), dropping the second derivatives of the amplitudes with respect to z, multiplying both sides by $E_{jk}^*(x, y)$, integrating over the transverse cross section, we obtain the system of reduced equations for the fields amplitudes:

$$i\frac{\partial \tilde{A}_{10}}{\partial z_a} + i\tilde{v}_{10}\tau_p^{-1}\frac{\partial \tilde{A}_{10}}{\partial \tau} + \frac{\partial^2(\beta_{10}\omega/c)}{2\tau_p^2 \partial \omega^2}\frac{\partial^2 \tilde{A}_{10}}{\partial \tau^2} + \quad (10)$$

$$\frac{K_1 \omega}{c2\beta}\tilde{A}_{11}\exp(i\tilde{\alpha}_1 z_a \omega/c) + \tilde{\chi}_0^{(1)}\frac{\omega}{c2\beta}\tilde{A}_{20}\tilde{A}_{10}^*\exp(i2\tilde{\Delta}_0 z_a \omega/c) = 0$$

$$i\frac{\partial \tilde{A}_{11}}{\partial z_a} + i\tilde{v}_{11}\tau_p^{-1}\frac{\partial \tilde{A}_{11}}{\partial \tau} + \frac{\partial^2(\beta_{11}\omega/c)}{2\tau_p^2 \partial \omega^2}\frac{\partial^2 \tilde{A}_{11}}{\partial \tau^2} +$$

$$\frac{K_1 \omega}{c2\beta}\tilde{A}_{10}\exp(i\tilde{\alpha}_1 z_a \omega/c) + \tilde{\chi}_1^{(1)}\frac{\omega}{c2\beta}\tilde{A}_{21}\tilde{A}_{11}^*\exp(i2\tilde{\Delta}_1 z_a \omega/c) = 0$$

-continued $$i\frac{\partial \tilde{A}_{20}}{\partial z_a} + i\tilde{v}_{20}\tau_p^{-1}\frac{\partial \tilde{A}_{20}}{\partial \tau} + \frac{\partial^2(\beta_{20}\omega/c)}{2\tau_p^2 \partial \omega^2}\frac{\partial^2 \tilde{A}_{20}}{\partial \tau^2} +$$

$$\frac{K_2 \omega}{c\beta}\tilde{A}_{21}\exp(2i\tilde{\alpha}_2 z_a \omega/c) +$$

$$\tilde{\chi}_0^{(2)}\frac{\omega}{c2\beta}\tilde{A}_{20}\tilde{A}_{10}^2\exp(-i2\tilde{\Delta}_0 z_a \omega/c) = 0$$

$$i\frac{\partial \tilde{A}_{21}}{\partial z_a} + i\tilde{v}_{21}\tau_p^{-1}\frac{\partial \tilde{A}_{21}}{\partial \tau} + \frac{\partial^2(\beta_{21}\omega/c)}{2\tau_p^2 \partial \omega^2}\frac{\partial^2 \tilde{A}_{21}}{\partial \tau^2} +$$

$$\frac{K_2 \omega}{c\beta}\tilde{A}_{20}\exp(-2i\tilde{\alpha}_2 z_a \omega/c) + \tilde{\chi}_1^{(2)}\frac{\omega}{c2\beta}\tilde{A}_{11}^2\exp(-i2\tilde{\Delta}_1 z_a \omega/c) = 0$$

which represent generalization of the equations (A. A Maier. Sov. J. Quantum Electron. 12, (No 12) 1661(1982)) on the case of the dispersive waveguides, $\tau=(t-z_q/\mu)/\tau_p$, $v_{jk}$ is difference in inverse group velocities $\mu_{jk}^{-1}$ waves with frequency jω in the k-th waveguide from $\mu^{-1}$, $\mu$ is average group velocity $$u^{-1} = (1/4)\sum_{j,k} u_{jk}^{-1}.$$

Magnitude $$\frac{\partial^2(\beta_{jk}\omega/c)}{2\tau_p^2 \partial \omega^2} = \frac{1}{2l_{d,jk}},$$

where $I_{d,jk}=\tau_p^2/[\partial^2(\beta_{jk}\omega/c)/\partial\omega^2]$ is dispersion length for frequency jω in k-th waveguide; $\chi_k^{(1)}$—quadratically nonlinear coefficient (factor) of the k-th waveguide, proportional to convolution of the tensor: $\chi_k^{(1)} \propto \vec{e}_{1k}\hat{\chi}\vec{e}_{2k}\vec{e}_{1k}$, $\chi_k^{(2)} \propto \vec{e}_{2k}\hat{\chi}_{1k}\vec{e}_{1k}$, and taking into account profiles of fields $E_{jk}$ (x, y), i.e. distribution of a field on transversal coordinates x and y in each waveguide at each frequency, and also overlapping of profiles of interacting fields at various frequencies; the factor 4;r is included in magnitude of nonlinearity. Let's designate $\chi_k=(\chi_k^{(1)}+\chi_k^{(2)})/2$. As a rule, $\chi_k^{(1)}=\chi_k^{(2)}=\chi_k$.

$$\beta = (1/4)\sum_{j,k}\beta_{jk}.$$

We write these equations in soliton normalization:

$$i\frac{\partial A_{10}}{\partial z} + iv_{10}\frac{\partial A_{10}}{\partial \tau} + D_{10}\frac{\partial^2 A_{10}}{\partial \tau^2} + \quad (11)$$

$$K_1 A_{11}\exp(i\alpha_1 z) + \chi_0^{(1)} A_{20} A_{10}^* \exp(i2\Delta_0 z) = 0$$

$$i\frac{\partial A_{11}}{\partial z} + iv_{11}\frac{\partial A_{11}}{\partial \tau} + D_{11}\frac{\partial^2 A_{11}}{\partial \tau^2} + K_1 A_{10}\exp(-i\alpha_1 z) +$$

$$\chi_1^{(1)} A_{21} A_{11}^* \exp(i2\Delta_1 z) = 0$$

$$i\frac{\partial A_{20}}{\partial z} + iv_{20}\frac{\partial A_{20}}{\partial \tau} + D_{20}\frac{\partial^2 A_{20}}{\partial \tau^2} + 2K_2 A_{21}\exp(i2\alpha_2 z) +$$

$$\chi_0^{(2)} A_{10}^2 \exp(-i2\Delta_0 z) = 0$$

$$i\frac{\partial A_{21}}{\partial z} + iv_{21}\frac{\partial A_{21}}{\partial \tau} + D_{21}\frac{\partial^2 A_{21}}{\partial \tau^2} +$$

$$2K_2 A_{21}\exp(-i2\alpha_2 z) + \chi_1^{(2)} A_{11}^2 \exp(-i2\Delta_1 z) = 0,$$

where the longitudinal coordinate $z=z_a/I_d$ is normalized by dispersive length $I_d=2\max\{\tau_p^2/[\partial^2(\beta_{jk}\omega/c)/\partial\omega^2]\}$, as which we take the greatest from dispersing lengths $I_{d,jk}$, multiplied by two: $I_d=2\max\{1_{d,jk}\}$; $D_{jk}$ is normalized the second-order dispersion; for selected normalization $|D_{jk}|\geq 1$. In (11) the normalized nonlinear factors $\omega_k^{(j)}=\omega_k^{(j)}/\omega$, where $\omega=(|\omega_0|+|\omega_1|)/2$;

$$A_{jk}=\tilde{A}_{jk}\frac{l_d 2\pi\tilde{\chi}}{\lambda\beta},$$

$\upsilon_{jk}=l_d\upsilon_{jk}/\tau_p$, $\Delta_k=\tilde{\Delta}k2\pi l_d/\lambda\beta$, $\alpha_j=\alpha_1 2\pi l_d/\lambda\beta$, typically $\omega_k^{(1)}=\omega_k^{(2)}=\omega_k$, where $\omega_k=\omega_k/\omega$. If the optical waveguides are identical, then $\omega_0=1$, $\omega_1=1$, $\alpha_j=0$.

Initial conditions have the form $$A_{jk}(z=0)=a_{jk}\exp(i\phi_{jk})/\cos h^\mu[(t-t_{jk,p})],$$

or $A_{jk(z=0)}=a_{jk}\exp(i\phi_{jk})\exp[-(t-t_{jk,d})^\mu/\tau_{jk,p}^\mu]$, where $1.5\leq\mu\leq 2.5$, $k=0,1$ is number of the optical waveguide, $j=1$ corresponds to frequency $\omega$, $j=2$ corresponds to frequency $2\omega$, t is time, $\tau_{jk,p}$ is duration of input pulse at the input of the k-th optical waveguide at frequency $j\omega$, $t_{jk,d}$ is time delay of the pulse at the input of the k-th optical waveguide at frequency get, $j\omega$, $\phi_{jk}$ is input phase of the pulse with frequency $j\omega$ at the input of the k-th waveguide, $a_{jk}$ is real normalized amplitude of the pulse with frequency $j\omega$ at the input of the k-th waveguide. In preferable embodiment the pulses are spectral-limited; but in general case, the pulses may be phase-modulated, e.g., $\phi_{jk}$ may be proportional to $t^2$.

For preferable embodiment the initial conditions have the form $$A_{jk}(z=0)=a_{jk}\exp(i\phi_{jk})/\cos h^2[(t-t_{jk,d})/\tau_p], \quad (12.1)$$

or $A_{jk}(=0)=a_{jk}\exp(i\phi_{jk})\exp[-(t-t_{jk,d})^2/\tau_p^2]$, (12.2)

where, as a rule, $t_{jk,d}<3\tau_p$; more typically $t_{jk,d}<\tau_p$; for preferable embodiment $t_{jk,d}<<\tau_p$, and we can consider $t_{jk,d}=0$.

Further numerical experiment showed the obtained results are qualitatively valid and for small difference between coefficients $\chi_0$, $\chi_1$, At infinity, the field vanishes: $|A_{jk}(z, \tau\to\pm\infty)|\to 0$.

One from the variants of the proposed method is based on the revealed possibility of drastic and profound self-switching of soliton-like pulses in quadratically nonlinear tunneling-coupled optical waveguides from one waveguide to another. In this self-switching, the solitons retain their shape, i.e., their temporal profile, and, thus, they are switched almost completely; this is one of the reasons for the fact that the self-switching is so profound. We emphasize that we are concerned here with switching the radiation from one waveguide to another rather than with switching from one frequency to another {as in [A. A. Maier, K.Yu. Sitarskii. *Sov. J. Quantum Electron.* 17, 1507(1987); Preprint IOFAN No.27 (Moscow: General Physics Institute, RF Acad. of Sc., 1995)]}. It is in this case that the solitonic shape can be retained, because the formation of solitons in a quadratically nonlinear medium is favored not only by a specific input-pulse amplitude at the frequency A, but also by particular ratio between the wave amplitudes of the frequencies $\omega$ and $2\omega$ at the input (in the case under consideration, at the input of the zero waveguide). As a rule, this ratio differs from the ratio of the input-wave amplitudes corresponding to self-switching from one frequency to another.

The self-switching can be caused by small variation both intensity and phase of one of the input radiations. Constant in intensity components of radiations with amplitudes $a_{1k}$ and $a_{2k}$ can be conditionally (conventionally) considered as optical pump radiation with frequencies $\omega$ and $2\omega$, and small variable component of one of these radiations as a controlling signal. The variable component can be caused either by small variation (modulation) of one of powerful radiations fed into the input of the same waveguide (which amplitudes are close to values $a_{1k}$ and $a_{2k}$) or by feeding of real small variable (in intensity or in phase) signal into the input of the same waveguide with the same frequency as the pump radiation.

In the general case, self-switching of solitons can be caused by variations of either the intensity or the phase of one of the four input radiation fluxes, corresponding to complex amplitudes: $A_{10}(t)$, $A_{11}(t)$, $A_{20}(f)$, $A_{21}(t)$; namely, 1) by a small variation of the pump intensity at the frequency $\omega$ (FIG. 8); 2) by a small variation of intensity at the frequency $2\omega$; 3) by a small variation of the pump phase at the frequency $\omega$ (FIGS.8); 4) by a small variation in the pump phase at the frequency $2\omega$); 5) by feeding or ceasing to feed a small-amplitude signal of the frequency $\omega$ to the input of the first waveguide and/or by varying the intensity or phase of this signal; and 6) by feeding or ceasing to feed a small-amplitude signal at the frequency $2\omega$ to the input of the first waveguide and/or by varying the intensity or phase of this signal. Self-switching can also result from simultaneous variation of the input parameters.

With intensities and phases of the input waves properly chosen, optical energy (beginning from a certain distance from the input) is almost evenly divided between the waveguides and the transfer of energy seems to cease; to be more precise, the period of this energy transfer increases drastically, and the system seems to remain temporarily at the self-switching midpoint M (FIG. 8c, 9c), so that a small variation of the input parameters in the vicinity of this point causes a switching of output energy to the zeroth or the first waveguide. A similar pattern was observed (FIG. 1–3) for solitons in tunneling-coupled optical waveguides with cubic nonlinearity.

Self-switching can occur for various relationships between the waveguides' tunneling-coupling coefficients at the fundamental and second harmonics; in particular, self-switching occurs when $K_1=2K_2$, $K_1=4K_2$.

In order to accomplish this, one should choose the relevant amplitudes of input waves at the frequencies $\omega$ and $2\omega$. The ratio of the input-wave amplitudes at the self-switching midpoint M depends on the relationship between $K_1$ and $K_2$.

Let us consider several cases that have emerged from numerical solution of the equations (11) supplemented with boundary (initial) conditions (12).

For the sake of simplicity, we assume that the synchronism condition $\Delta_0=\Delta_1=0$ is satisfied by one of the known methods, for example, by periodic modulation of the quadratic-nonlinearity coefficient of the waveguides, which can be accomplished by periodic variation of the sign of quadratic nonlineanrty. The other parameters are defined as $D_{2k}=2D_{1k}=2$, $\upsilon_{jk}=0$, $\alpha_j=0$. Let $K_1=1$ and $K_2=\frac{1}{4}$ (typically, $K_2$ is appreciably smaller than $K_1$), let the solitons with $a_{10}=5.684\sqrt{2}$, $a_{20}=4$, $a_{11}=a_{21}=0$, $\phi_{10}=\phi_{20}=0$, be introduced into the zeroth waveguide; and let the length of the TCOW l=6. In this case, the output power carried by the solitons is concentrated in the first waveguide (FIG. 8a). If the input amplitude of the fundamental wave is slightly increased by setting $a_{10}=5.697\sqrt{2}$, all the soliton-related power becomes switched to the output of the zeroth waveguide (FIG. 8b). If the input-signal phase is changed to $\phi_{10}=\pi/105$ (with the other parameters unchanged), the soliton-carried power returns to the output of the first waveguide, so that the plot of power distribution along the tunneling-coupled optical waveguide almost coincides with the plot shown in FIG. 8a. Thus, we can almost completely switch the solitons from the output of one waveguide to the output of the other waveguide by insignificantly varying the input phase of one wave signal, for example, of that corresponding to the fundamental frequency.

The parameters $a_{10}=5.69049\sqrt{2}$, $a_{20}=4$, $a_{11}=a_{21}=0$, correspond to the self-switching midpoint M (FIG. 8c) when the power is shared equally between the two waveguides (beginning at a certain distance from the input).

Let $K_1=1$, $K_2=\frac{1}{2}$; let the solitons with $a_{10}=5.5\sqrt{2}$, $a_{20}=5.0$, and $a_{11}=a_{21}=0$, $\phi_{10}=\phi_{20}=0$, introduced into the zeroth waveguide; and let the waveguide length $l=3.6$. In this case, the soliton-related power is concentrated in the first waveguide at the output (FIG. 9a). If the input amplitude of the fundamental wave is slightly increased by setting $a_{10}=5.72\sqrt{2}$, the entire soliton power is switched to the output of the zeroth waveguide (FIG. 9b). If the phase of this wave is changed to $\phi_{10}=\pi/18$ (with the other parameters unchanged), the soliton-carried power is switched back to the output of the first waveguide; as a result, the power distribution along the tunneling-coupled optical waveguide becomes almost identical to that shown in FIG. 9a.

The parameters $a_{10}=5.623\sqrt{2}$, $a_{20}=5.0$, $a_{11}=a_{21}=0$, and $\phi_{10}=\phi_{20}=0$ correspond to the self-switching midpoint M (FIG. 9c) when the power is evenly divided between the waveguides (beginning at a certain distance from the input). The same midpoint M is also attained for the parameters $a_{10}=5.5\sqrt{2}$, $a_{20}=5.248$, $a_{11}=a_{21}=0$, and $\phi_{10}=\phi_{20}=\phi_{11}=0$ in this case, the power distribution is almost the same as for the previous set of parameters.

Let us assume that $K_1=K_2=1$ (this relationship between the parameters is difficult to attain in practice; basically, however, it is feasible); the waveguide length is $l=4.4$; and the solitons (12.1) having $a_{10}=a_{20}\sqrt{2}$, $a_{20}=6$, $a_{11}=a_{21}=0$, $\phi_{10}=\phi_{20}=\phi_{11}=0$, and the frequencies $\omega$ and $2f$ are introduced into the input of the zeroth waveguide. In this case, the soliton-related output power is concentrated in the first waveguide. Now, if a small-amplitude optical signal having $a_{11}=0.012$ is fed to the input of the first waveguide, all the soliton-related power becomes switched to the output of the zeroth waveguide. When the phase of this signal is changed to $\phi_{11}=0.3\pi$ (without changing the other parameters) the soliton-related power is switched back to the output of the first waveguide. If no signal is fed to the first waveguide ($a_{11}=a_{21}=0$), but the amplitude a, is increased to $a_{10}=6.015\sqrt{2}$, the entire power of the solitons is also switched to the output of the zeroth waveguide. If we now set $\phi_{10}=\pi/250$, the solitons are again switched to the output of the first waveguide. The same results (and nearly the same plots) can be obtained by varying $a_{20}$ or $\phi_{20}$ with the other parameters unchanged. Thus, for $a_{20}=6.025$, $a_{10}=6\sqrt{2}$, and $\phi_{10}=\phi_{20}=\phi_{11}=0$, the solitons are found at the output of the zeroth waveguide, whereas, for the same $a_{10}$ and $a_{20}$, but $\phi_{20}=-\pi/130$, the solitons emerge from the first waveguide.

Figure 10:
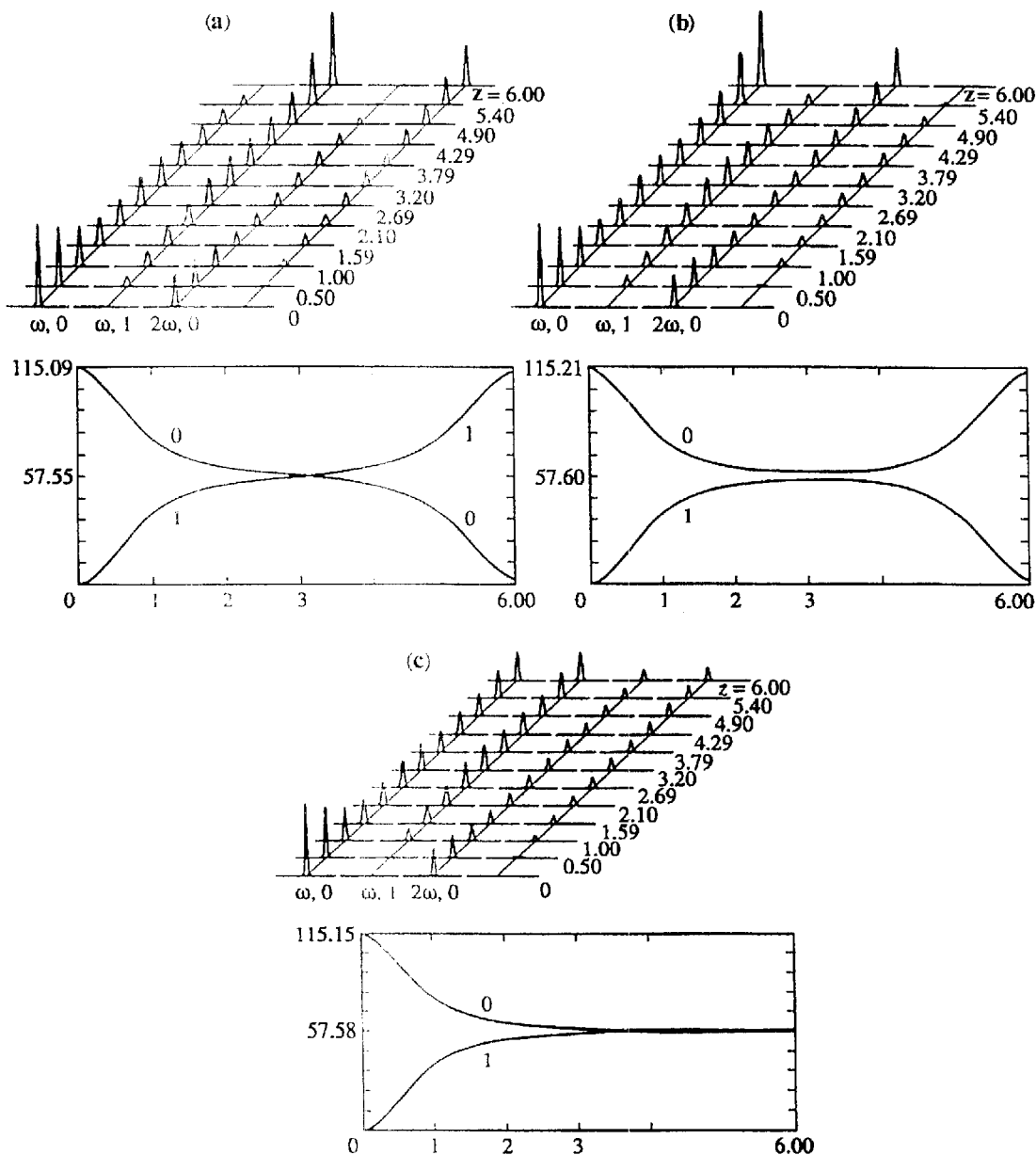
FIG. 10 shows the same as the FIG. 8, except that $K_1=1$, $K_2=\Delta_0=\Delta_1=½$; l=6; $a_{20}=5$; $a_{10}=5.5372\sqrt{2}$ (a), $a_{10}=5.541\sqrt{2}$ (b), $a_{10}=5.5392\sqrt{2}$ (c).

It was assumed in the foregoing $\Delta_0=\Delta_1=0$. Self-switching of solitons can occur for $\Delta_0\neq 0$, $\Delta_1 0$ as well, if the <<coupled waves>> synchronism [A. A. Maier. *Sov. J. Quantum Electron.* 10 925 (1980)] is attained due to tunnel coupling (FIG. 10). In the case of FIG. 10, $K_2=\Delta_0=\Delta_1=\frac{1}{2}$. In general case the synchronism of the coupled waves corresponds to accomplishing of the relations $p\gamma_1-q\gamma_2=\Delta$, $\Gamma\pi e\gamma_j=\sqrt{(\alpha_{j/2})^2+K_{j^2}}$, $\Delta=(\Delta_0+A_1)/2$.

Figure 11:
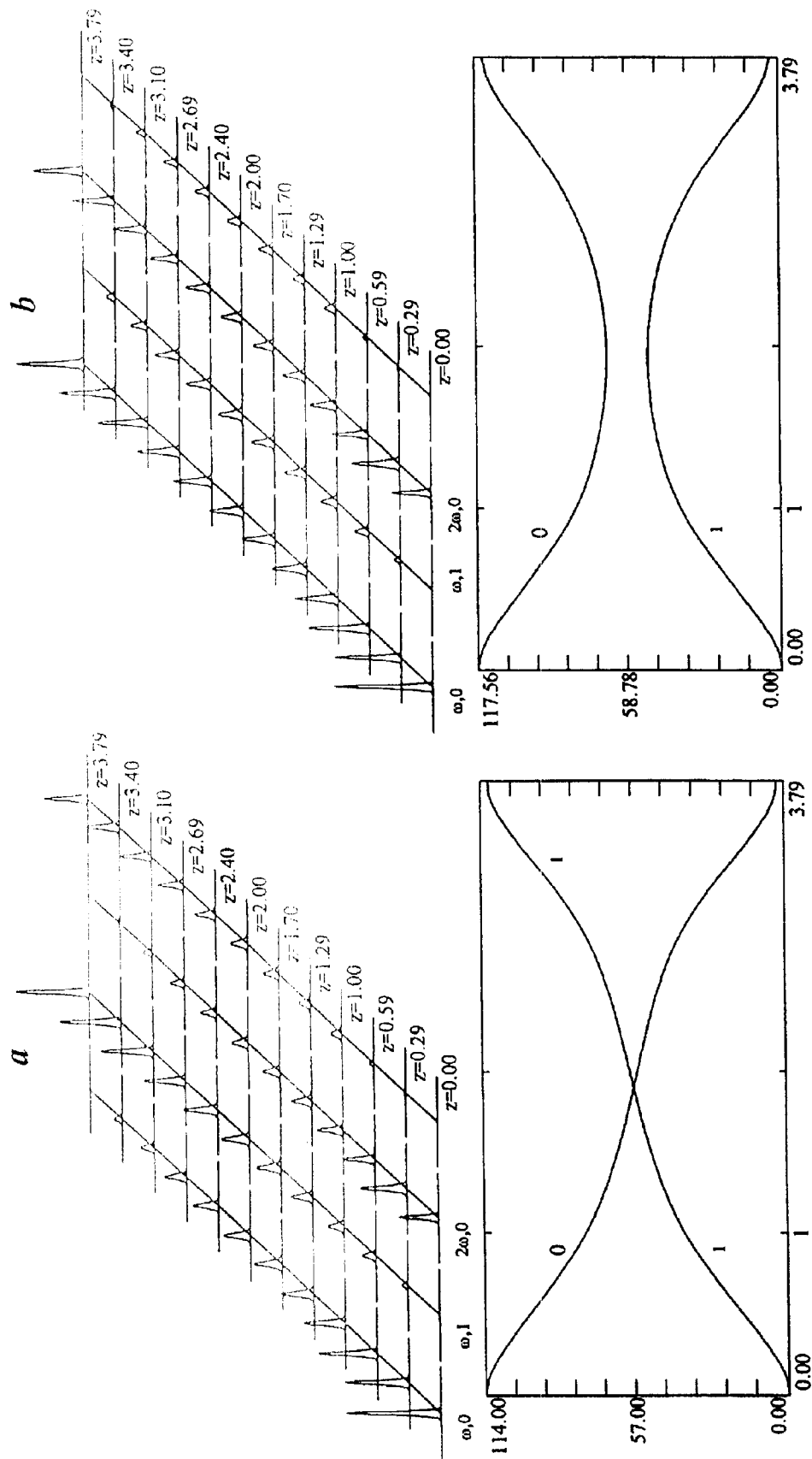
FIG. 11 shows the same as the FIG. 8, except that $K_1=1$, $K_2=½$, $\Delta_0=1$, l=3.79, $a_{20}=5$, $a_{10}=5.5\sqrt{2}$ (a), $a_{10}=5.562\sqrt{2}$ (b).
Figure 12:
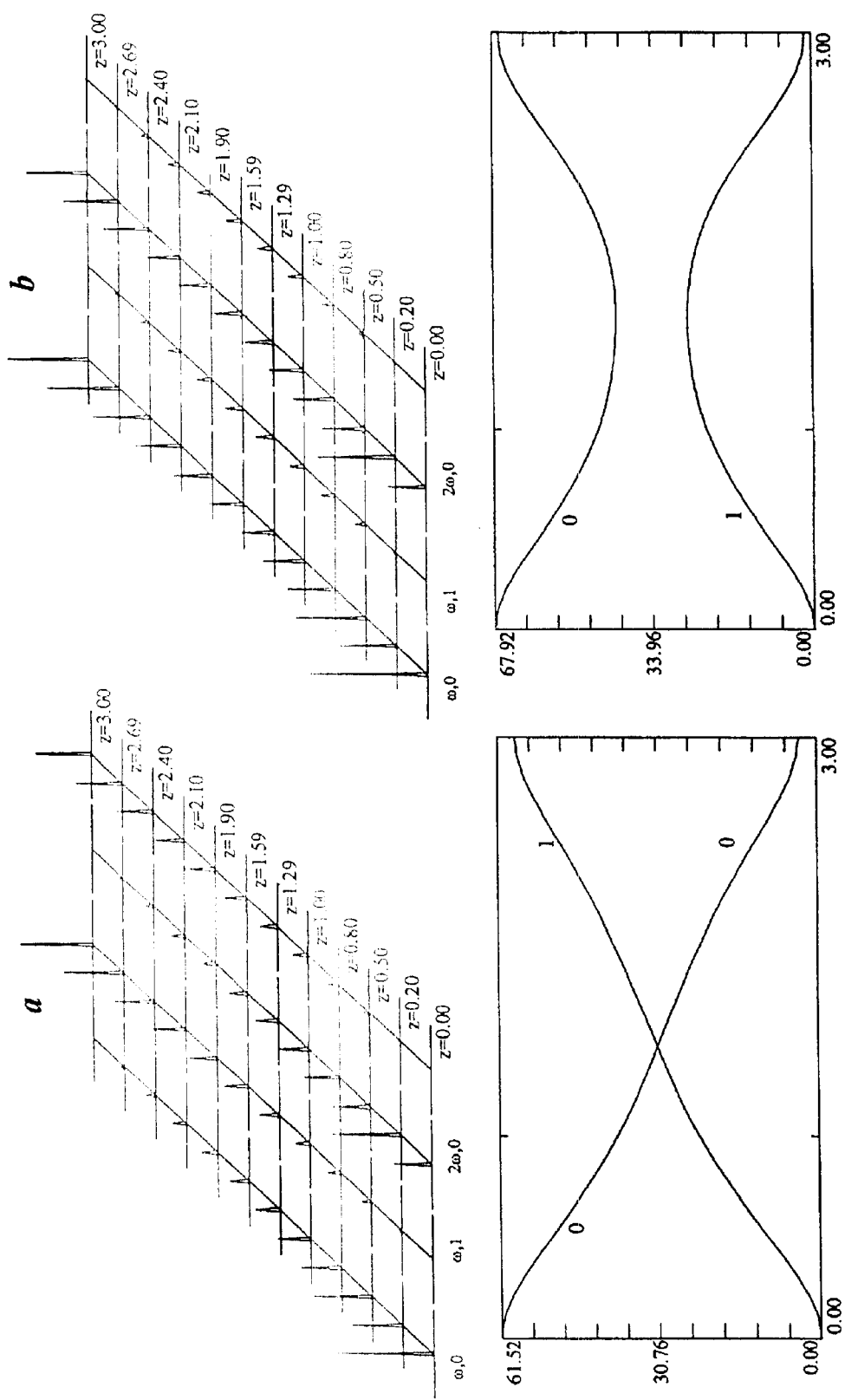
FIG. 12 shows the same as the FIG. 8, except that $K_1=1$, $K_2=½$, $\Delta_0=\Delta_1=2$, $a_{20}=5$, $a_{10}=5.58\sqrt{2}$ (a), $a_{10}=5.62\sqrt{2}$ (b), l=3.
Figure 13:
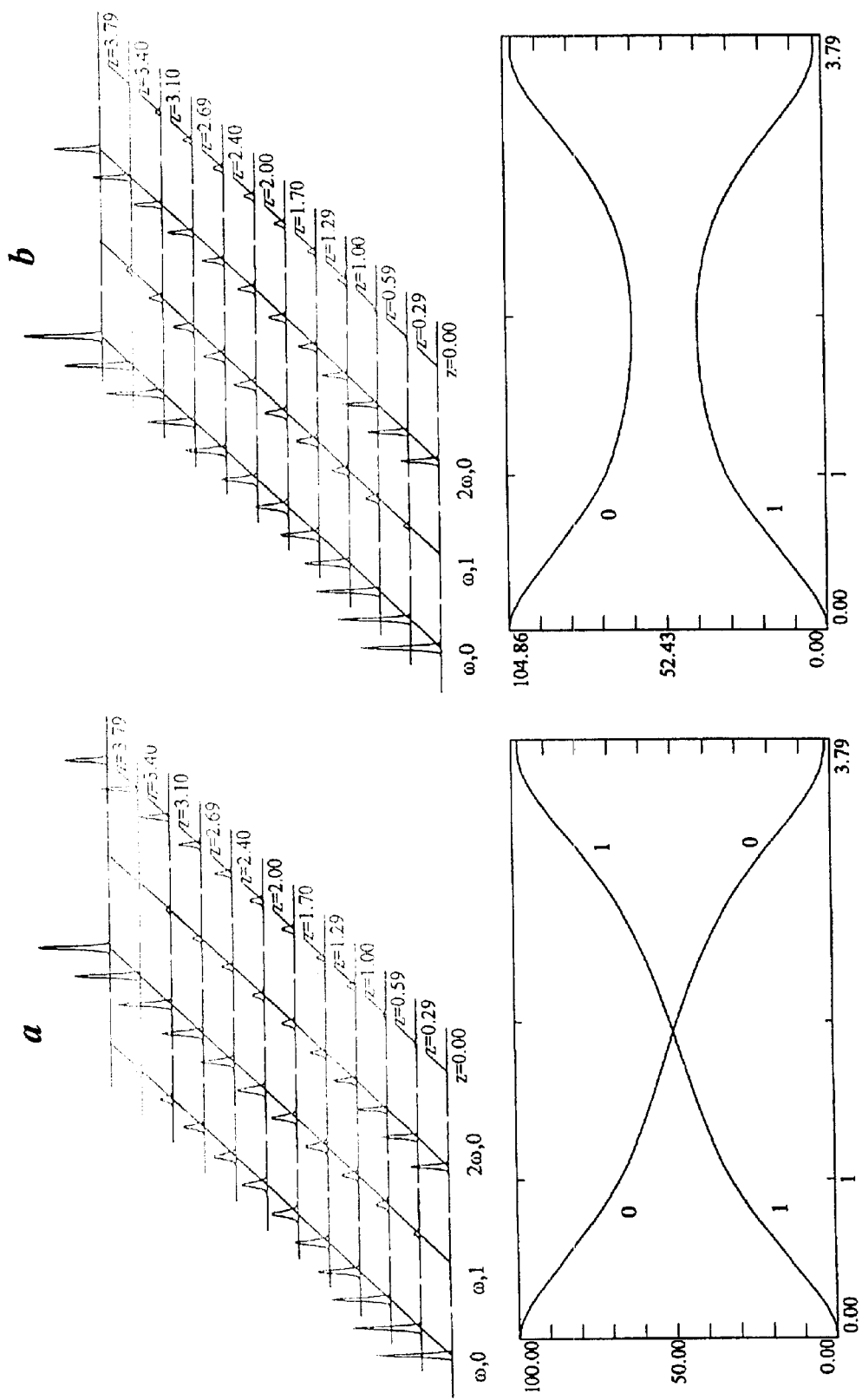
FIG. 13. shows the same as the FIG. 8, except that $K_1=1$, $K_2=½$, $\Delta_0=\Delta_1=0$, $a_{20}=5$, $a_{10}=5.0\sqrt{2}$ (a), $a_{10}=5.179\sqrt{2}$ (b), l=3.8, $D_{2k}=D_{1k}=1$.
Figure 14:
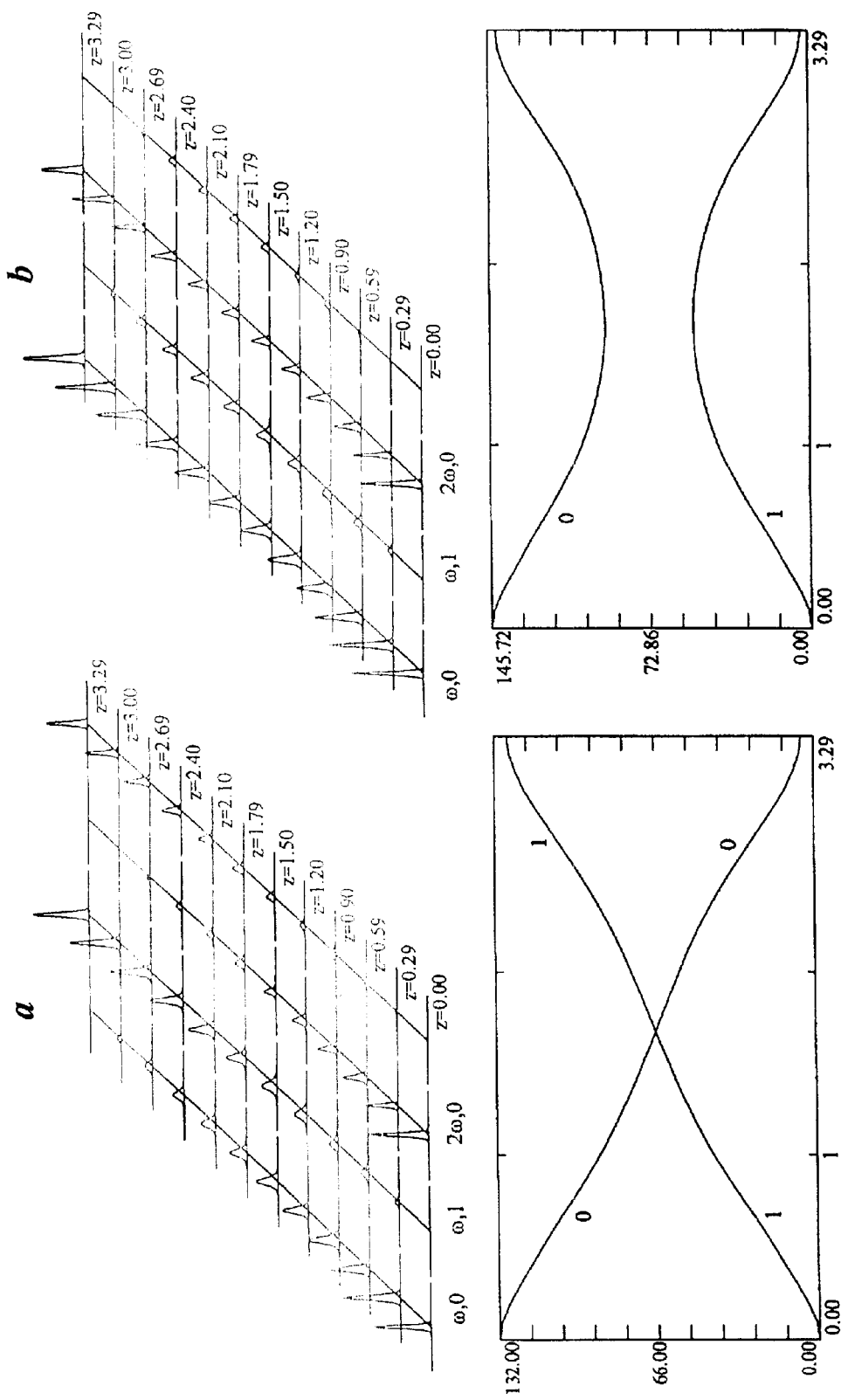
FIG. 14. shows the same as the FIG. 8, except that $K_1=1$, $K_2=½$, $\Delta_0=\Delta_1=0$, $a_{20}=5$, $a_{10}=7\sqrt{2}$ (a), $a_{10}=7.7\sqrt{2}$ (b), l=33, $D_{2k}=1$, $D_{1k}=2$.
Figure 15:
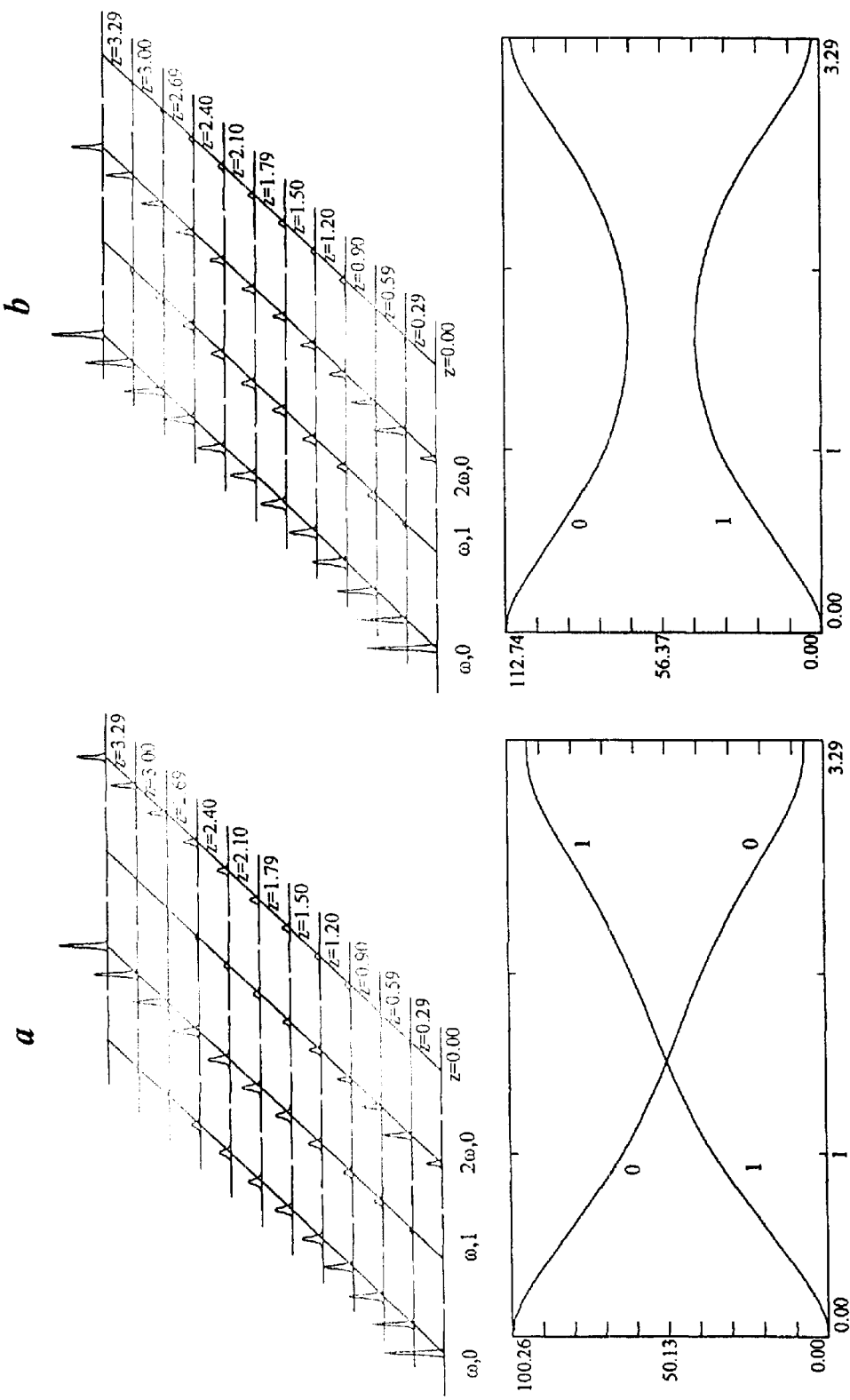
FIG. 15 shows the same as the FIG. 8, except that $A_{jk}(z=0)=a_{jk}\exp(i\phi_{jk})\exp(-t^2/\tau_p^2)$, $a_{20}=4$, $a_{10}=8.0$ (a), $a_{10}=8.6$ (b), $D_{jk}=1$.
Figure 16:
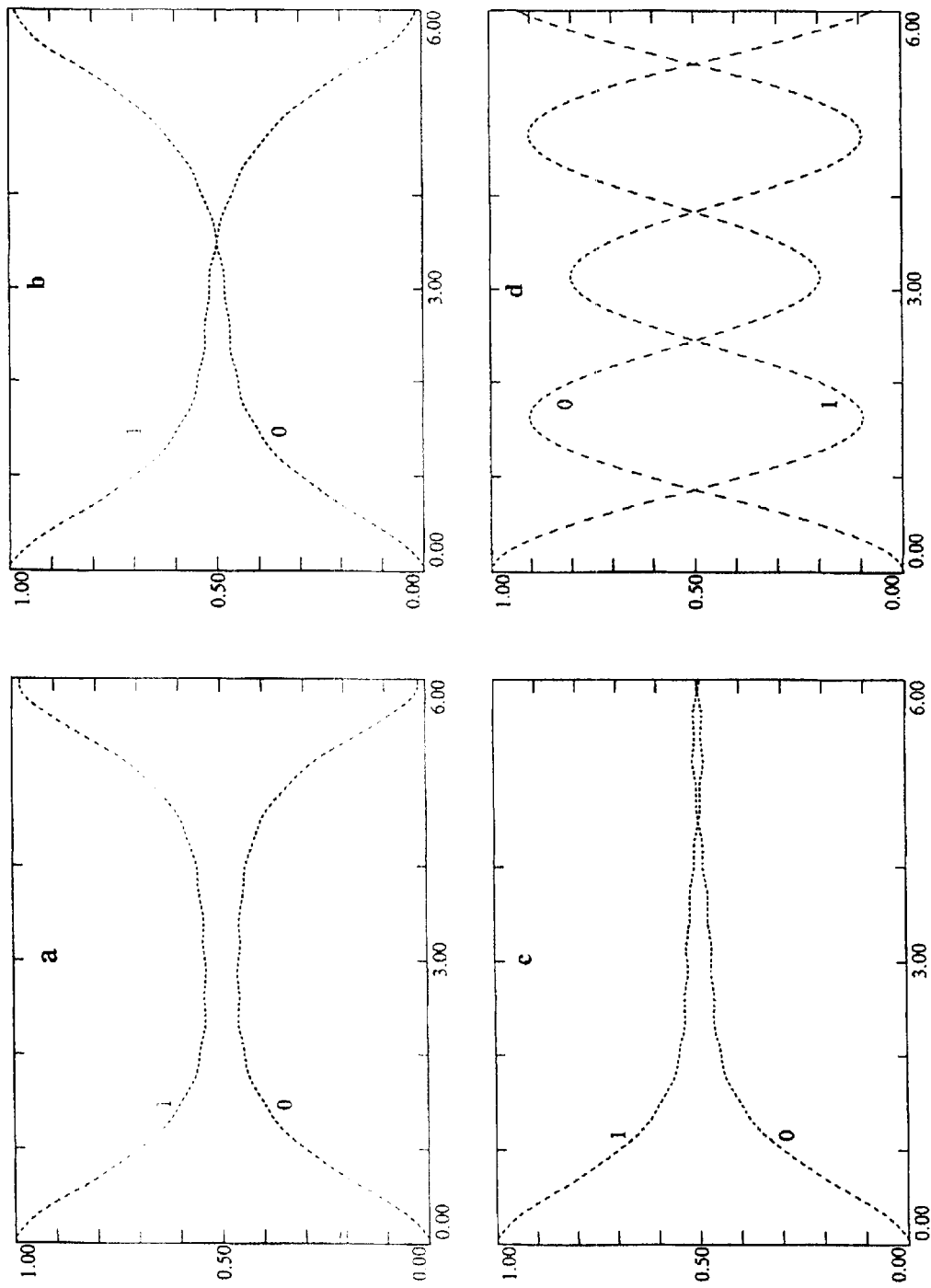
FIG. 16 demonstrates switching of ordinary radiation (not obligatory solitons) from one waveguide to another in quasi-stationary case: $D_{2k}=D_{1k}=0$, $v_{jk}=0$; $\rho_{10}(z=0)=5.697\sqrt{2}\cdot0.73675$, point $M_0$ (a); $\rho_{10}(z=0)=5.684\sqrt{2}\cdot0.73675$, point $M_1$ (b); $\rho_{10}(z=0)=5.69049\sqrt{2}\cdot0.73675$, midpoint M (c); $\rho_{20}(z=0)=4.0\cdot0.73675$; d—linear case: $\chi_k=0$.

It was assumed in the foregoing that phase matching condition is fulfilled. However the switching can occur even with tuning out from the phase matching condition (FIG. 11,12). For enough large tuning out from a synchronism ($\Delta_0=\Delta_1=2$) the additional shortening of duration solitons (FIG. 12) happens. For some more large tuning out ($\Delta_0=\Delta_1\approx 3$) the pulses begin diffuse (especially at frequency $2\omega$), and depth and sharpness of the switching are reduced. For even greater tuning out from a synchronism ($\Delta_0=\Delta_1\geq 4$) the switching is infringed; the mode of soliton propagation is infringed also.

Figure 8:
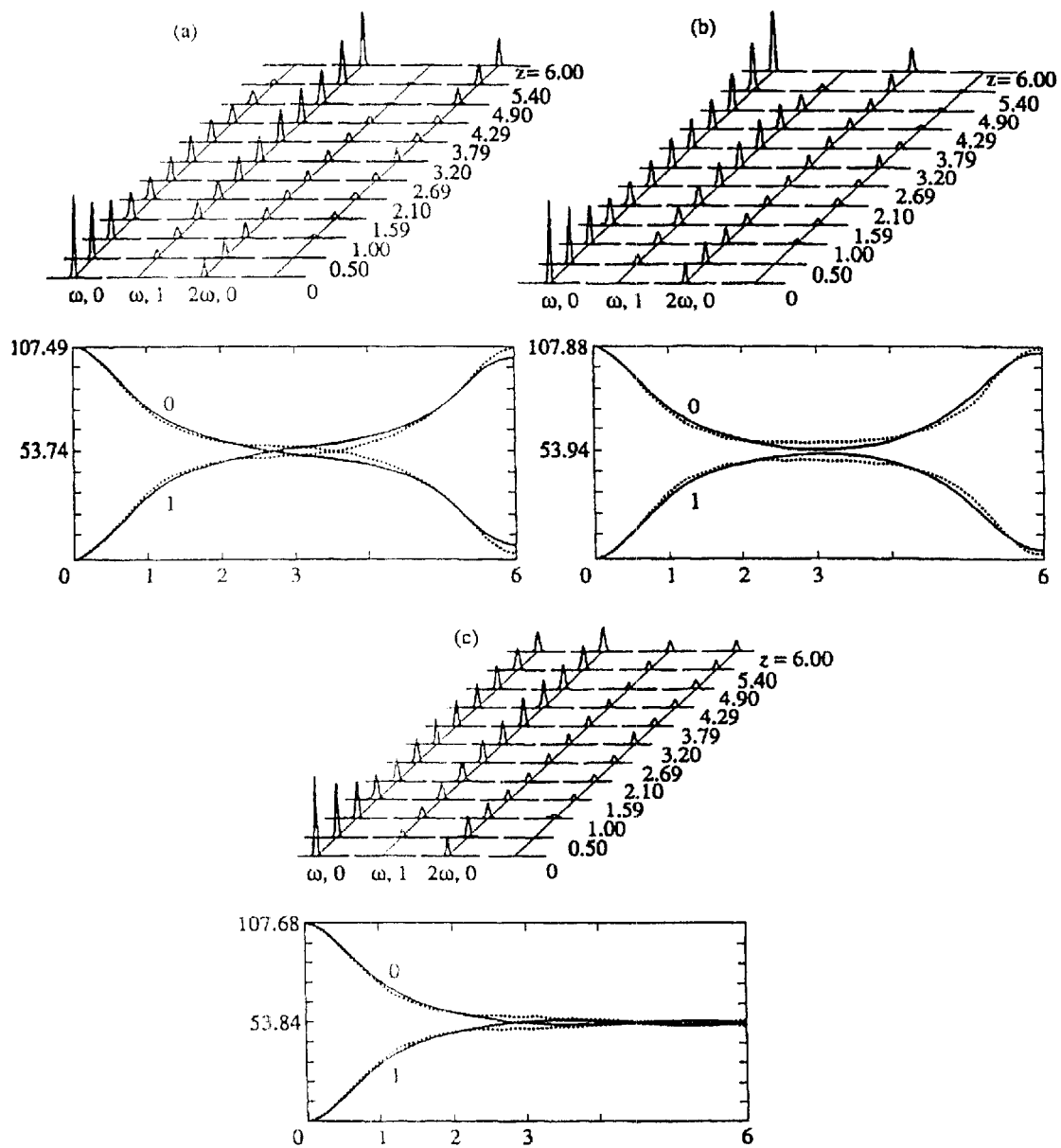
FIG. 8 shows temporal power profiles $|A_{jk}(\tau)|^2$ (upper panel) in waveguides <<0>> and <<1>> (at frequencies ω and 2ω) and the energies (lower panel, solid lines) in the same waveguides for different values of normalized longitudinal coordinate z. Self-switching of solitons for parameters $D_{2k}=2D_{1k}=2$, $K_1=1$, $K_2=¼$; $\Delta_0=\Delta_1=0$, $a_j=0$, $v_{jk}=0$, $\phi_{j0}=0$, $a_{20}=4$, $a_{10}=5.684\sqrt{2}$ (a), $a_{10}=5.697\sqrt{2}$ (b), $a_{10}=5.69049\sqrt{2}$ (c). The lenghth of TCOW l=6. Dotted curve shows the result of solution of ordinary differential equations (14,16), which are equivalent to equations (10,11). $A_{jk}(z=0)=a_{jk}\exp(i\phi_{jk})/\cos h^2(t/\tau_p)$.
Figure 9:
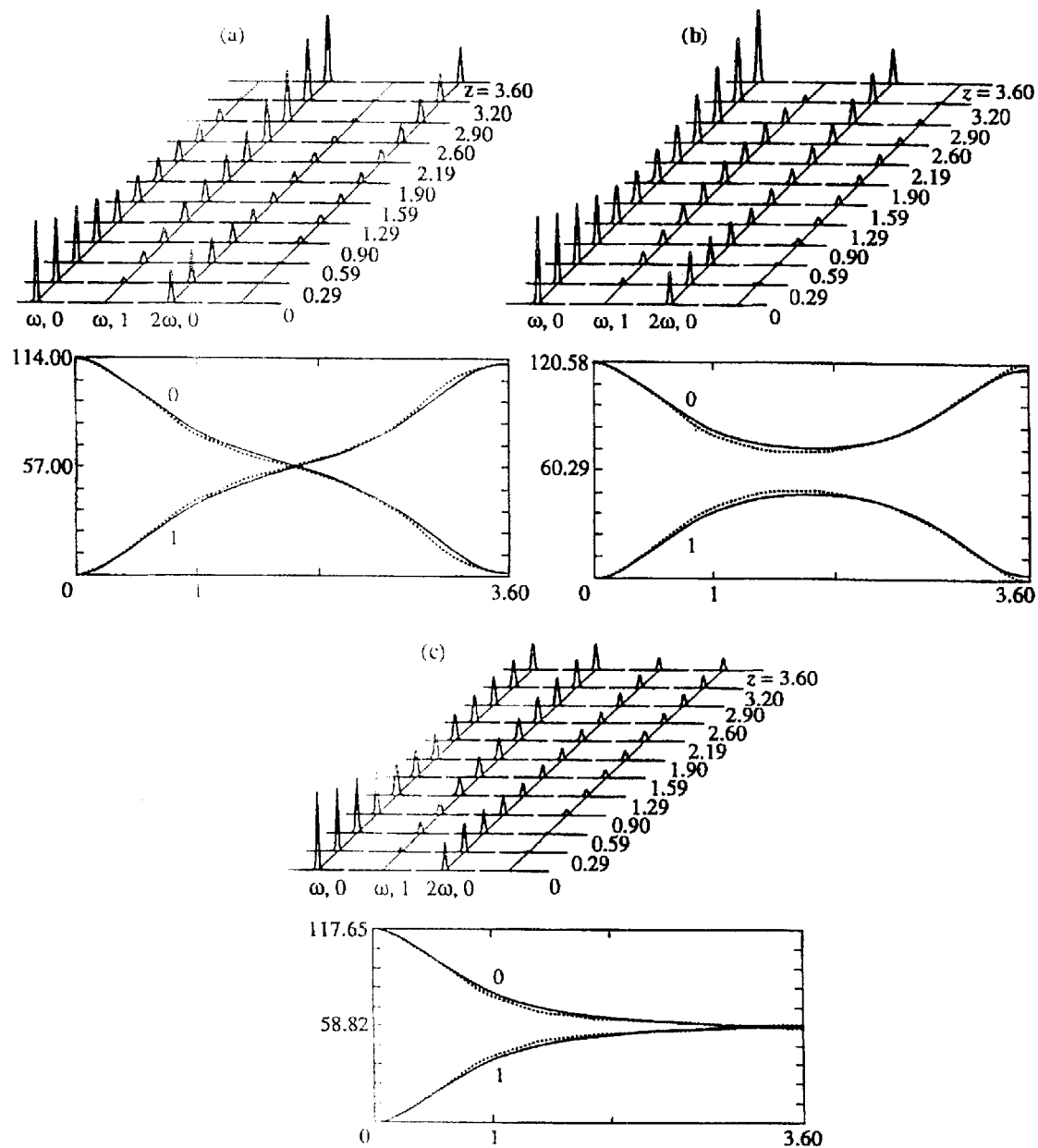
FIG. 9 shows the same as the FIG. 8, $K_1=1$, $K_2=½$; $a_{20}=5$; $a_{10}=5.5\sqrt{2}$ (a), $a_{10}=5.72\sqrt{2}$ (b), $a_{10}=5.623\sqrt{2}$ (c); l=3.6.

The following factor also has a beneficial effect: switching from one waveguide to the other occurs not only for the fundamental frequency, but (simultaneously and almost synchronously) also for the doubled frequency (notwithstanding the difference between $K_1$ and $K_2$), with an insignificant exchange of energy between the different-frequency waves. Therefore, we can record and evaluate the overall power at the two frequencies at the output of both zero and first waveguides (FIG. 8, FIG. 9). The switching of optical energy occurs between two distinct states: <<0>> and <<1>>. In state <<0>>, almost all the energy (total for the two frequencies) is concentrated at the output of the zeroth waveguide, whereas, in state <<1>>, the same is true for the first waveguide (of course, we can denote the states in the reverse way).

The outlined results are of important practical significance. The point is that the response of optical switches and discrete optical transistors based on quadratically nonlinear tunneling-coupled optical waveguides is fundamentally faster than the response of discrete optical transistors using soliton self-switching in similar cubically nonlinear waveguides, because quadratic nonlinearity is attained more rapidly than cubic nonlinearity. Quadratically nonlinear solitons feature a smaller width and have a higher peak power; thus, basically, these solitons make it possible to process and switch a larger body of data than the solitons in cubically nonlinear tunneling-coupled optical waveguides.

The variants of the method concerning switching, controlling, modulation and amplification of continuous waves radiations are based on similar phenomenon taking place in quadratically nonlinear TCOW under amplitude or phase change of one of waves fed into input of the TCOW.

In a quasi-stationary approximation, when the variances of the second order and difference of group velocities can be neglected, the equations (10) for amplitudes of waves $\tilde{A}_{jk}$ look like [A. A. Maier. *Sov. J. Quantum Electron.* 12 1661 (1982)]:

$$i\frac{\partial \tilde{A}_{10}}{\partial z_a} + \frac{K_1\omega}{c2\beta}\tilde{A}_{11}\exp(i\tilde{\alpha}_1 z_a\omega/c) + \tag{13}$$

$$\tilde{\chi}_0\frac{\omega}{c2\beta}\tilde{A}_{20}\tilde{A}^*_{10}\exp(i2\tilde{\Delta}_0 z_a\omega/c) = 0$$

$$i\frac{\partial \tilde{A}_{11}}{\partial z_a} + \frac{K_1\omega}{c2\beta}\tilde{A}_{10}\exp(-i\tilde{\alpha}_1 z_a\omega/c) +$$

$$\tilde{\chi}_1\frac{\omega}{c2\beta}\tilde{A}_{21}\tilde{A}^*_{11}\exp(i2\tilde{\Delta}_1 z_a\omega/c) = 0$$

$$i\frac{\partial \tilde{A}_{20}}{\partial z_a} + \frac{K_2\omega}{c\beta}\tilde{A}_{21}\exp(2i\tilde{\alpha}_2 z_a\omega/c) +$$

$$\tilde{\chi}_0\frac{\omega}{c2\beta}\tilde{A}^2_{10}\exp(-i2\tilde{\Delta}_0 z_a\omega/c) = 0$$

$$i\frac{\partial \tilde{A}_{21}}{\partial z_a} + \frac{K_2\omega}{c\beta}\tilde{A}_{20}\exp(-2i\tilde{\alpha}_2 z_a\omega/c) +$$

$$\tilde{\chi}_1\frac{\omega}{c2\beta}\tilde{A}^2_{11}\exp(-i2\tilde{\Delta}_1 z_a\omega/c) = 0$$

Figure 17:
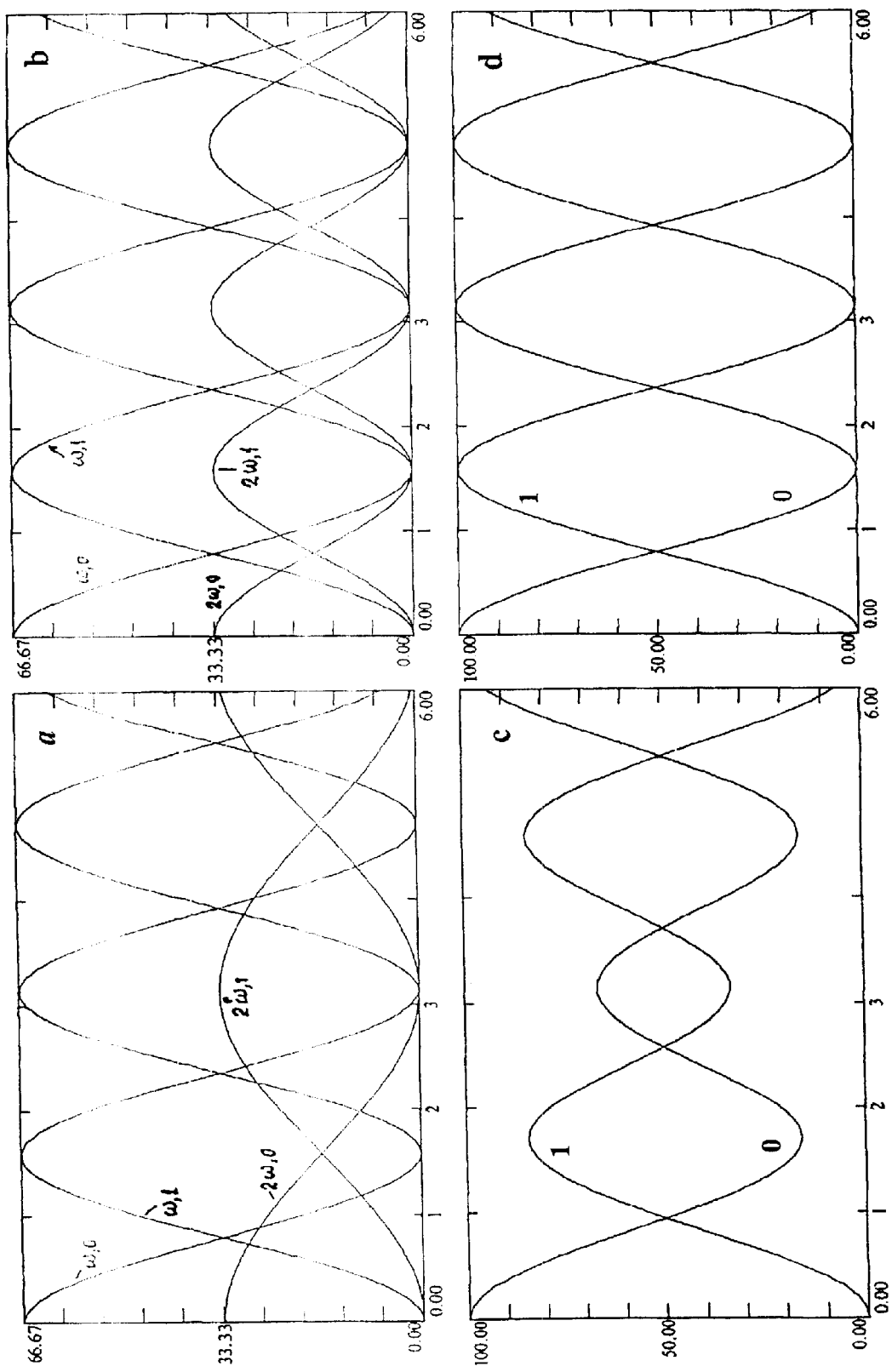
FIG. 17 is distribution of energy between waveguides (along the length) at frequencies ω and 2ω in linear regime: $\chi_k=0$; $K_1=1$, $K_2=¼$ (a, c); $K_1=1$, $K_2=½$ (b, d).

For normalized quantities the equations take the form:

$$i\frac{\partial B_{10}}{\partial \zeta} + K_1 B_{11} \exp(i\alpha_1\zeta) + \chi_0 B_{20} B_{10}^* \exp(i2\Delta_0\zeta) = 0 \quad (14)$$

$$i\frac{\partial B_{11}}{\partial \zeta} + K_1 B_{10} \exp(-i\alpha_1\zeta) + \chi_1 B_{21} B_{11}^* \exp(i2\Delta_1\zeta) = 0$$

$$i\frac{\partial B_{20}}{\partial \zeta} + 2K_2 B_{21} \exp(i2\alpha_2\zeta) + \chi_0 B_{10}^2 \exp(-i2\Delta_0\zeta) = 0$$

$$i\frac{\partial B_{21}}{\partial \zeta} + 2K_2 B_{21} \exp(-i2\alpha_2\zeta) + \chi_1 B_{11}^2 \exp(-i2\Delta_1\zeta) = 0,$$

where we shall consider, that $K_1=1$, and $K_2$ is measured in shares of $K_1$. It assumes, that the longitudinal coordinate $\zeta=z_a/l_c$ is normalized on length of beat (transfer) of power at frequency $\omega$ in linear mode for $\alpha_1=0$, i.e. by length $l_c$, over which the transfer of radiation power (originally fed into the zero waveguide) into the first waveguide (FIG. 17) happens. As a normalization let's assume $\chi_k=\chi_k/\chi$, and $\chi=(|\chi_0|+|\chi_1|)/2$, and for identical TCOW $\chi_0=1I$, $\chi_1=1$. Such normalization assumes, that $$B_{jk} = \tilde{A}_{jk}\frac{\tilde{X}}{K_1} = \tilde{A}_{jk}\frac{l_c 2\tilde{X}}{\lambda\beta},$$

is the length of "linear" transfer (beat) of power between the waveguides at the frequency $\omega$.

Having presented amplitude as $$B_{jk}(z)=\rho_{jk}(z)\exp[i\phi_{jk}(z)], \quad (15)$$

for modules of and phases of waves amplitudes we obtained the system of equations:

$$\rho_{1k}+(-1)^k K_1 \rho_{1,1-k} \sin\psi_1 + \chi_k \rho_{2k}\rho_{1k} \sin\psi_{2k}=0$$

$$\rho_{2k}+(-1)^k 2K_2 \rho_{2,1-k} \sin\psi_2 - \chi_k \rho_{1k}^2 \sin\psi_{2k}=0 \quad (16)$$

$$\psi_1' = \alpha_1 + K_1\left(\frac{\rho_{10}}{\rho_{11}} - \frac{\rho_{11}}{\rho_{10}}\right)\cos\psi_1 + \chi_1 \rho_{21}\cos\psi_{21} - \chi_0 \rho_{20}\cos\psi_{20}$$

$$\psi_2' = 2\alpha_2 + 2K_2\left(\frac{\rho_{20}}{\rho_{21}} - \frac{\rho_{21}}{\rho_{20}}\right)\cos\psi_2 + \chi_1 \frac{\rho_{11}^2}{\rho_{21}}\cos\psi_{21} - \chi_0 \frac{\rho_{10}^2}{\rho_{20}}\cos\psi_{20}$$

$$\psi_{20}' =$$

$$2\Delta_0 + 2\left(\frac{\rho_{21}}{\rho_{20}}K_2\cos\psi_2 - \frac{\rho_{21}}{\rho_{20}}K_1\cos\psi_1\right) - \chi_0\left(\frac{\rho_{10}^2}{\rho_{20}}\cos\psi_{21} - 2\rho_{20}\right)\cos\psi_{20},$$

$\psi_{21}\psi_{20}+\psi_2-2\psi_1$, where $\psi_j=\phi_{j1}-\phi_{j0}+\alpha_j\zeta$, $\psi_{2k}=\phi_{2k}-2\phi_{1k}+2\Delta_k\zeta$, $k=0,1$. Computing have confirmed a possibility of switching of any coherent pulse or continuous optical radiations (and not only solitons) in quadratically nonlinear TCOW from one waveguide to other and have revealed area of parameters, when such switching is possible.

Assuming that the shape of the solitons is almost unchanged and remains the same shape as given by equations (12), we represent the fields as $A_{jk}(z,\tau)=\rho_{jk}(z)\exp[i\phi_{jk}(z)]/\cos h^2(\tau)$. On multiplying both parts of all equations (11) by the soliton-profile function $\cos h^{-2}(\tau)$ and integrating with respect to $\tau$ between $-\infty$ and $+\infty$, we arrive at the following system of ordinary differential equations:

$$i\frac{\partial B_{10}}{\partial \zeta} - (4/5)D_{10}B_{10} + K_1 B_{11}\exp(i\alpha_1\zeta) + \chi_0^e B_{20}B_{10}^*\exp(i2\Delta_0\zeta) = 0 \quad (17)$$

-continued $$i\frac{\partial B_{11}}{\partial \zeta} - (4/5)D_{11}B_{11} +$$
$$K_1 B_{10}\exp(-i\alpha_1\zeta) + \chi_1^e B_{21}B_{11}^*\exp(i2\Delta_1\zeta) = 0$$

$$i\frac{\partial B_{20}}{\partial \zeta} - (4/5)D_{20}B_{20} + 2K_2 B_{21}\exp(i2\alpha_2\zeta) +$$
$$\chi_0^e B_{10}^2 \exp(-i2\Delta_0\zeta) = 0$$

$$i\frac{\partial B_{21}}{\partial \zeta} - (4/5)D_{21}B_{21} + 2K_2 B_{21}\exp(-i2\alpha_2\zeta) +$$
$$\chi_1^e B_{11}^2 \exp(-i2\Delta_1\zeta) = 0,$$

where $\zeta=z_a\omega/c$. Representing the amplitude in the form:

$$B_{jk}(z)=\rho_{jk}(z)\exp[i\phi_{jk}(z)],$$

for modules of amplitudes and phases of waves we obtain the following system of equations $$\rho_{1k}+(-1)^k K_1 \rho_{1,1-k}\sin\psi_1 + \chi_k^c \rho_{2k}\rho_{1k}\sin\psi_{2k}=0\rho_{2k}+$$
$$(-1)^k 2K_2 \rho_{2,1-k}\sin\psi_2 - \chi_k^c \rho_{1k}^2 \sin\psi_{2k}=0 \quad (18)$$

$$\psi_1' = -0.8(D_{11}-D_{10}) + \alpha_1 +$$
$$K_1\left(\frac{\rho_{10}}{\rho_{11}}-\frac{\rho_{11}}{\rho_{10}}\right)\cos\psi_1 + \chi_1^e \rho_{21}\cos\psi_{21} - \chi_0^e \rho_{20}\cos\psi_{20}$$

$$\psi_2' = -0.8(D_{21}-D_{20}) + 2\alpha_2 +$$
$$2K_2\left(\frac{\rho_{20}}{\rho_{21}}-\frac{\rho_{21}}{\rho_{20}}\right)\cos\psi_2 + \chi_1^e \frac{\rho_{11}^2}{\rho_{21}}\cos\psi_{21} - \chi_0^e \frac{\rho_{10}^2}{\rho_{20}}\cos\psi_{20}$$

$$\psi_{20}' = -0.8(D_{20}-2D_{10}) + 2\Delta_0 + 2\left(\frac{\rho_{21}}{\rho_{20}}K_2\cos\psi_2 - \frac{\rho_{21}}{\rho_{20}}K_1\cos\psi_1\right) -$$
$$\chi_0^e\left(\frac{\rho_{10}^2}{\rho_{20}} - 2\rho_{20}\right)\cos\psi_{20},$$

$\psi_{21}=\psi_{20}+\psi_2-2\psi_1$, where $\psi_j=\phi_{j1}-\phi_{j0}+\alpha_j\zeta$, $\psi_{2k}=\phi_{2k}-2\phi_{1k}+2\Delta_k\zeta$, $k=0,1$, prime designates derivative with respect to $\zeta=z_a\omega/c$.

Thus, to a first approximation, system (11) is equivalent to the system of ordinary differential equations (18) involving the effective nonlinear coefficients $\chi_0^c$ and $\chi_1^c$, and effective values $\Delta_k^c=\Delta_k-0.4(D_{2k}-2D_{1k})$, $\alpha_j^c=\alpha_j-0.8(D_{j1}-D_{j2})$. In the most typical case of $\chi_0=\chi_1=\chi$, we have $\chi_0^c=\chi_1^c=\chi^c$. The said above analytic calculation gives $\chi_k^c=0.8\chi_k=0.8$. Really we took into account that $$\chi_k^e = \frac{\int_{-\infty}^{\infty} \chi_k \cosh^{-6}(\tau)d\tau}{\int_{-\infty}^{+\infty} \cosh^{-4}(\tau)d\tau} = \frac{4}{5}\chi_k.$$

Actually, $\chi^e$ is somewhat smaller (due to an insignificant difference between the pulse shape in one of TCOW and the input-pulse shape), and is equal to $0.73675\chi$ for the parameters corresponding to FIG. 8 and $\chi^c=0.741\chi$ in the case of FIG. 2. The calculations lend support to the validity of this approach (FIGS. 8,9). Thereby accounts in addition have confirmed a possibility of switching of any coherent pulse or continuous optical radiations (and not just solitons) in quadratically nonlinear TCOW from one waveguide to other and have revealed area of parameters, when such switching is possible.

Let us note, square of amplitude: $|a_{k0}|^2$, or $|a_{jk}|^2$, or $|\rho_{jk}|^2$ is proportional to both power and intensity of corresponding pulse and/or wave, and so it is called (for short and simplicity) as intensity in Claims. Similarly, $I_M$ is proportional to critical intensity and is called critical intensity although it has dimensionality differed from dimentionality of intensity.

Industrial Applicability

The invention can find application in optical communication lines as the amplifier of weak signals, re-translator, logic element, amplifier in transmitting and receiving device, and also as the super-high-speed modulator. Besides the invention can be used in optical computers and computing devices and systems.

What is claimed is:

1. A method for switching, amplification and modulation of unidirectional distributively coupled pulses and waves, consisting in that they feed optical radiation in the form of pulses into the input of tunnel-coupled optical waveguides having nonlinearity and the second-order dispersion, the switching of the pulses from one waveguide to the other one is fulfilled by variation of at least one parameter of the radiation, CHARACTERIZED in that
said tunnel-coupled optical waveguides have quadratic nonlinearity,
the pulses are fed at frequencies $\omega$ and $2\omega$ into the input of one of tunnel-coupled optical waveguides, or into inputs of the different tunnel-coupled optical waveguides,
input normalized complex amplitudes of the pulses correspond to formulas $$A_{jk}(z=0)=\alpha_{jk}\exp(i\phi_{jk})/\cos h^{\mu}[(t-t_{jk,d})/\tau_{jk,p}],$$

$$\text{or } A_{jk}(z=0)=\alpha_{jk}\exp(i\phi_{jk})\exp[-(t-t_{jk,d})^{\mu}/\tau_{jk,p}^{\mu}],$$

where $1.5 \leq \mu \leq 2.5$, k=0,1 is number of the optical waveguide, j=1 corresponds to frequency $\omega$, j=2 corresponds to frequency $2\omega$, t is time, $\tau_{jk,p}$ is duration of input pulse at the input of the k-th optical waveguide at frequency $j\omega$, $t_{jk,d}$ is time delay of the pulse at the input of the k-th optical waveguide at frequency $j\omega$, $\phi_{jk}$ is input phase of the pulse with frequency $j\omega$ at the input of the k-th waveguide, $\alpha_{jk}$ is real normalized amplitude of the pulse with frequency $j\omega$ at the input of the k-th waveguide,
the input normalized real amplitudes $\alpha_{jk}$ of fed pulses are chosen to satisfy to at least one pair of following pairs of inequalities: $\alpha_{10} \geq 2$ and $\alpha_{20} \geq 2$, $\alpha_{11} \geq 2$ and $\alpha_{21} \geq 2$, $\alpha_{11} \geq 2$ and $\alpha_{20} \geq 2$, $\alpha_{21} \geq 2$ and $\alpha_{10} \geq 2$,
under this the switching of the pulses from one waveguide to another is done by change of amplitude $a_{10}$ and/or amplitude $a_{11}$, and/or amplitude $a_{20}$, and/or amplitude $a_{21}$, or phase $\phi_{10}$, and/or phase $\phi_{11}$, and/or phase $\phi_{20}$, and/or phase $\phi_{21}$ of fed pulses at the input of at least one of said optical waveguides with at least one of said frequencies.

2. The method as set above in claim 1, CHARACTERIZED in that $\mu=2$.

3. The method as set above in claim 1, CHARACTERIZED in that a difference of $\tau_{jk,p}$ from the average quadratic duration $\tau_p$ of the fed pulses is not more than $\tau_p$.

4. The method as set above in claim 3, CHARACTERIZED in that all fed pulses have the same input duration: $\tau_{jk,p}=\tau_p$.

5. The method as set above in claim 1, CHARACTERIZED in that $t_{jk,d}$ is not more than $\tau_p$.

6. The method as set above in claim 5, CHARACTERIZED in that $t_{jk,d}=0$.

7. The method as set above in claim 1, CHARACTERIZED in that said input normalized real amplitudes $\alpha_{jk}$ of the fed pulses are chosen to satisfy to at least one pair of the following pails of inequalities $3 \leq \alpha_{10} \leq 9\sqrt{2}$ and $3 \leq \alpha_{20} \leq 9\sqrt{2}$, $3 \leq \alpha_{11} \leq 9\sqrt{2}$ and $3 \leq \alpha_{21} \leq 9\sqrt{2}$, $3 \leq \alpha_{11} \leq 9\sqrt{2}$ and $3 \leq \alpha_{20} \leq 9\sqrt{2}$, $3 \leq \alpha_{21} \leq 9\sqrt{2}$ and $3 \leq \alpha_{10} \leq 9\sqrt{2}$.

8. The method as set above in claim 1, CHARACTERIZED in that variation of said amplitude $\alpha_{jk}$, causing switching of pulses from one waveguide to another, does not exceed 0.2 of maximum from the values $\alpha_{jk}$.

9. The method as set above in claim 1, CHARACTERIZED in that variation of phase $\phi_{jk}(z=0)$, causing switching of pulses from one waveguide to another, does not exceed $0.2\pi$.

10. The method as set above in claim 1, CHARACTERIZED in that the length oh tunnel coupling of the waveguides is more or equals a half of minimum from the beat lengths at frequencies $\omega$ and $2\omega$ in linear regime.

11. The method as set above in claim 1, CHARACTERIZED in that the tunnel-coupled optical waveguides are made in the form dual-core fiber optic waveguide or on the basis of KTP crystal, or on the basis of semiconductor layered quantum-well structure, or on the basis of crystal fiber from ferro-organic materials with large quadratic nonlinearity.

12. The method as set above in claim 1, CHARACTERIZED in that phase-matching condition is fulfilled.

13. The method as set above in claim 1, CHARACTERIZED in that $|\Delta| \leq 10K_1$, where $\Delta=(\Delta_0+\Delta_1)/2$, $\Delta_k=\beta_{2k}-\beta_{1k}$ is difference in refractive indices at frequencies $2\omega$ and $\omega$ in the k-th waveguide, $K_1$ is tunnel-coupling factor at frequency $\omega$.

14. The method as set above in claim 1, CHARACTERIZED in that $|\alpha_j| \leq 10K_1$, where $\alpha_j=\beta_{j1}-\beta_{j0}$ is difference between effective refractive indexes of the waveguides at frequency $j\omega$.

15. The method as set above in claim 1, CHARACTERIZED in that $|(\chi_1-\chi_0)/\chi| \leq 10K_1$, where $\chi=(|\chi_0|+|\chi_1|)/2$, $\chi_k$ is quadratic-nonlinear coefficient of the k-th waveguide.

16. The method as set above in claim 1, CHARACTERIZED in that $0.08 \leq |D_{1k}/D_{2k}| \leq 12$, where $D_{jk}$ is coefficient of the second-order dispersion of the k-th waveguide at the frequency $j\omega$.

17. The method as set above in claim 1, CHARACTERIZED in that all the fed pulses are spectral-limited pulses.

18. The method as set above in claim 1, CHARACTERIZED in that at least one of the fed pulses is phase-modulated pulse.

19. A method for switching, amplification and modulation of unidirectional distributively coupled pulses and waves, consisting in that they feed optical radiation into at least one input of tunnel-coupled nonlinear optical waveguides, switching of radiation from one waveguide to another is accomplished by variation of one of parameter of said radiation, CHARACTERIZED in that
the tunnel-coupled optical waveguides have quadratic nonlinearity,
the fed radiation contains optical waves with frequencies $\omega$ and $2\omega$, which are fed into the input of one optical waveguide or into inputs of different optical waveguides,
input normalized real amplitudes $\rho_{jk}(z=0)$ of fed waves are chosen to satisfy to at least one pair of following pairs of inequalities: $\rho_{10}(z=0) \geq 2$ and $\rho_{20}(z=0) \geq 2$, $\rho_{11}(z=0) \geq 2$ and $\rho_{21}(z=0) \geq 2$, $\rho_{11}(z=0) \geq 2$ and $\rho_{20}(z=0) \geq 2$, $\rho_{21}(z=0) \geq 2$ and $\rho_{10}(z=0) \geq 2$, where k=0,1 is a number of the optical waveguide, j=1 corresponds to a), j=2 corresponds to $2\omega$, under this the switching is fulfilled by variation of amplitude $p_{10}(z=0)$ and/or amplitude $\rho_{11}(z=0)$, and/or amplitude $\rho_{20}(z=0)$, and/or amplitude $\rho_{21}(z=0)$, or phase $\phi_{10}(z=0)$, and/or phase $\phi_{11}(z=0)$, and/or phase $\phi_{20}(z=0)$, and/or phase $\phi_{21}(z=0)$ of fed waves at the input of at least one of said optical waveguides with at least one of said frequencies.

20. The method as set above in claim 19, CHARACTERIZED in that said normalized input real amplitudes are chosen to satisfy to at least one pair of the following pairs of inequalities: $3 \leq \rho_{10}(z=0) \leq 9\sqrt{2}$ and $3 \leq \rho_{20}(z=0) \leq 9\sqrt{2}$, $3 \leq \rho_{11}(z=0) \leq 9\sqrt{2}$ and $3 \leq \rho_{21}(z=0) \leq 9\sqrt{2}$, $3 \leq \rho_{11}(z=0) \leq 9\sqrt{2}$ and $3 \leq \rho_{20}(z=0) \leq 9\sqrt{2}$, $3 \leq \rho_{21}(z=0) \leq 9\sqrt{2}$ and $3 \leq \rho_{10}(z=0) \leq 9\sqrt{2}$.

21. The method as set above in claim 19, CHARACTERIZED in that the change of said input amplitude $\rho_{jk}(z=0)$, causing the switching of optical radiation from one waveguide to another does not exceed 0.2 of maximum from values of the input amplitudes $\rho_{jk}(z=0)$.

22. The method as set above in claim 19, CHARACTERIZED in that the change of phase $\phi_{jk}(z=0)$, causing the switching of optical radiations from one waveguide to another does not exceed $0.2\pi$.

23. The method as set above in claim 19, CHARACTERIZED in that a length of tunnel coupling of the waveguides is more than or equals half of maximum from the beat lengths at frequencies $\omega$ and $2\omega$ in linear regime.

24. The method as set above in claim 19, CHARACTERIZED in that the tunnel-coupled optical waveguides are made in the form of dual-core fiber optic waveguide or on the basis of KTP crystal, or on the basis of semiconductor layered quantum-well structure, or on the basis of crystal fiber from ferro-organic materials with large quadratic non-linearity.

25. The method as set above in claim 19, CHARACTERIZED in that phase-matching condition is fulfilled.

26. The method as set above in claim 19, CHARACTERIZED in that $|(\chi_1-\chi_0)/\chi| \leq 10 K_1$, where $K_1$ is coefficient of the tunnel coupling at frequency $\omega$, $\chi=(|\chi_0|+|\chi_1|)/2$, $\chi_k$ is a quadratic-nonlinear coefficient of the k-th waveguide.

* * * * *